(12) United States Patent
Lin et al.

(10) Patent No.: US 9,039,563 B2
(45) Date of Patent: May 26, 2015

(54) SPEED CHANGING APPARATUS

(75) Inventors: Shih-Liang Lin, New Taipei (TW);
Hsin-Yang Su, Taoyuan County (TW);
Ming-Chih Tsai, Taoyuan County (TW)

(73) Assignee: SUN RACE STURMEY-ARCHER, INC., Hai-Hu Village, Lu-Ju, Taoyuan County (TW)

( * ) Notice: Subject to any disclaimer, the term of this patent is extended or adjusted under 35 U.S.C. 154(b) by 678 days.

(21) Appl. No.: 13/277,292

(22) Filed: Oct. 20, 2011

(65) Prior Publication Data
US 2012/0100948 A1    Apr. 26, 2012

(30) Foreign Application Priority Data
Oct. 25, 2010 (TW) .............................. 099136365 A

(51) Int. Cl.
*B62M 6/65* (2010.01)
*B62M 11/16* (2006.01)
*F16H 3/00* (2006.01)
*F16H 3/54* (2006.01)

(52) U.S. Cl.
CPC .................. *B62M 11/16* (2013.01); *B62M 6/65* (2013.01); *F16H 3/005* (2013.01); *F16H 3/54* (2013.01)

(58) Field of Classification Search
CPC ................................................ F16H 2048/202
See application file for complete search history.

(56) References Cited

U.S. PATENT DOCUMENTS

| | | | |
|---|---|---|---|
| 4,446,757 A | 5/1984 | La Fever | |
| 4,955,627 A | 9/1990 | Hartmann | |
| 5,730,232 A * | 3/1998 | Mixer | ........................... 173/176 |
| 7,628,727 B2 * | 12/2009 | Nagai et al. | ................... 475/291 |
| 2010/0011891 A1 | 1/2010 | Yang | |

FOREIGN PATENT DOCUMENTS

| | | |
|---|---|---|
| EP | 0676561 A1 | 10/1995 |
| EP | 2204316 A1 | 7/2010 |
| WO | 2006033541 A1 | 3/2006 |
| WO | 2006048731 A2 | 5/2006 |
| WO | 2008088169 A1 | 7/2008 |
| WO | WO2008088169 * | 7/2008 |

* cited by examiner

*Primary Examiner* — Ramya Burgess
*Assistant Examiner* — Mark Manley
(74) *Attorney, Agent, or Firm* — Barlow, Josephs & Holmes, Ltd.

(57) ABSTRACT

A speed changing apparatus includes a planet gear set having a sun gear, planet pinions, a planet pinion carrier and a ring gear mounted inside a rotary sleeve. The sun gear is driven by a D.C. motor to rotate in either of two opposed rotary directions. Clutch arrangements are operative to lock one of either the carrier arm or the ring gear to a rotationally fixed component and to drivingly couple the other of the carrier arm and the ring gear to the sleeve ring depending on the direction of rotation of the motor. Different gear ratios are selected by reversing the direction of rotation of the motor whilst the sleeve ring is always driven in same direction. The speed change apparatus may be part of a hub of an electric vehicle in which the sleeve ring is a hub shell and the apparatus is mounted about an axle.

8 Claims, 15 Drawing Sheets

SPEED CHANGING APPARATUS

FIELD OF THE INVENTION

The present invention relates to a speed changing apparatus, and more particularly, to a multi-stage gear shifting apparatus using the clockwise and counterclockwise rotation of a power input, especially a motor, coupled with a planet gear set to change the gear ratio.

BACKGROUND OF THE INVENTION

Transmission is a vital component in multi-speed electric vehicles or power tools. The transmission system typically accounts for about half of the production cost. Thus research on speed changing apparatus has been a key task for makers of electric vehicles or power tools. In an electric vehicle for example, a good transmission system enables riders to change the revolution ratio in response to the surrounding environment so as to attain an appropriate speed or torque.

For multispeed electric vehicles, planetary gear sets are commonly used in transmission system. In a planetary internal transmission system, a planetary gear train is used as the principal part of speeding changing apparatus where the apparatus is installed in a rear wheel hub shell to achieve varying revolution ratios by changing the gear ratio of the planetary gear train through different input, output and stationary pieces.

An internal transmission using a planetary gear train as the principal part of its speed changing apparatus offers the following advantages. Firstly, with a small size and precise construction, its installation and use are less confined by the narrow space in the rear wheel hub shell. Secondly, the gear shifting process works stably so that it will not cause the chain to engage different chain wheels, thereby effectively improving the drawback of chain derailment and increasing the transmission efficiency. Thirdly, the speed changing apparatus is protected by the external housing of the wheel hub shell from the outside environment, which could prolong its service life. Fourthly, the speed changing apparatus is installed inside the wheel hub shell so that not as much noise as an external transmission would be produced during the gearshift.

According to the transmission principle of a planetary gear train, the sun gear, planet gear (or carrier arm) and ring gear each have a shaft and these three gears revolve around one another. At different gears, one of the three gear shafts would stays stationary without turning, another is a driving shaft, and still another is an output shaft. Different combinations result in gear ratios needed in different revolutions for deceleration, acceleration or reverse. Six possible combinations are shown as below.

| Combination | 1 | 2 | 3 | 4 | 5 | 6 |
| --- | --- | --- | --- | --- | --- | --- |
| Sun gear | Stationary | Output | Stationary | Driving | Output | Driving |
| planet pinions (or carrier arm) | Driving | Driving | Output | Output | Stationary | Stationary |
| Ring gear | Output | Stationary | Driving | Stationary | Driving | Output |

The present invention focuses on the internal speed changing apparatus of a planetary gear train for wheeled or electric vehicles. Additionally, heightened awareness to environmental protection has made electric bicycles and vehicles popular in recent years. The majority of electric bicycles and vehicles on the market today are equipped with an internal transmission system. Thus, internal transmission has gradually become a focus of research efforts for large vehicle makers.

SUMMARY OF THE INVENTION

The primary object of the invention is to provide a speed changing apparatus, which uses the clockwise and counterclockwise rotation of a motor coupled with a planet gear set to achieve the purpose of gear shift.

Another object of the invention is to provide a speed changing apparatus, which uses only one planet gear set to generate two sets of speed modes so as to achieve the purposes of lighter weight, taking less space, and lowering costs.

To achieve the aforesaid objects, there is provided a speed changing apparatus comprising:

a rotary power input selectively rotatable in either of two rotary directions (clockwise or counter clockwise);

a planet gear set, comprising a sun gear, a plurality of planet pinions, a carrier arm, and a ring gear; wherein the sun gear is drivingly connected to the power input, the sun gear, carrier arm and ring gear being rotatable about an axis;

a sleeve ring mounted about the planet gear set for rotation about the axis;

a third one-way clutch, operative between the sleeve ring and the carrier arm; and a fourth one-way clutch, operative between the sleeve ring and the ring gear;

characterized in that the apparatus has a first clutch configured to rotationally fix the carrier arm when the power input rotates in one rotary direction and to rotationally fix the ring gear when the power input rotates in the other rotary direction and in that the third and fourth one-way clutches are each operative to engage to transmit drive to the sleeve ring from the carrier arm and the ring gear respectively in the same rotary direction.

By driving the planet gear set with the clockwise or counterclockwise rotation of the power input, coupled respectively with controlling the engagement of the first clutch arrangement, the object of two-speed shift is achieved given the varying differentials generated by the carrier arm or the ring gear respectively driving the third one-way clutch or the fourth one-way clutch in the sleeve ring.

In one embodiment, the first clutch arrangement comprises a first one-way clutch operatively disposed between a rotationally fixed component and the carrier arm and a second one-way clutch operatively disposed between a rotationally fixed component and the ring gear, wherein the first one-way clutch and the second one-way clutch are operative to engage in same rotary direction as each other but in the opposite rotary direction to that of the third one-way clutch and the fourth one-way clutch.

The apparatus may be disposed on an axle, in which case the rotationally fixed component may be the axle or a component mounted on the axle. Where the power input is in the form of an electric motor, the rotationally fixed component could by an outer casing of the motor for example. The first and second one-way clutches could be operatively disposed between different rotationally fixed components and the carrier arm and ring gear respectively. Alternatively, the apparatus may comprise an outer casing, the sun gear, carrier arm, ring gear and sleeve ring, being mounted within the casing for rotation about the axis relative to the casing, in which case the outer casing may comprise the rotationally fixed component.

In another embodiment, in the first clutch arrangement comprises a clutch member movably but non-rotatably mounted to a rotationally fixed component and an actuator configured to move the clutch member to a first position to lock the carrier arm to the component in response to rotation of the power input in a first rotary direction and to move the clutch member to a second position to lock the ring gear to the component in response to rotation of the power input in a second rotary direction opposite to the first. The first clutch arrangement may comprise a sliding clutch member slidably but non-rotatably mounted to the component and movable from a first position in which it engages the carrier arm, or a member non-rotatably mounted thereto, to rotationally fix the carrier arm and a second position in which it engages with the ring gear, or a member non-rotatably mounted thereto, to rotationally fix the ring gear, a clutch actuator rotatably driven by the power input to rotate in either one of two rotational directions, the actuator drivingly engaging the sliding clutch member through a screw thread such that rotation of the power input in one rotary direction causes the sliding clutch member to be moved to the first position and that rotation of the power input in the other rotary diction causes the sliding clutch member to be moved to the second position. The actuator may be driven by the sun gear through a friction clutch to rotate in the same direction as the sun gear.

The apparatus may be disposed on an axle, in which case the rotationally fixed component may be the axle or component mounted on the axle. Alternatively, the apparatus may comprise an outer casing, the sun gear, carrier arm, ring gear and sleeve ring, being mounted within the casing for rotation about the axis relative to the casing, in which case the outer casing may comprise the rotationally fixed component.

The power input may be a direct current motor.

The power input may be arranged inside the sleeve ring and offset to one side of the axis, in this case, the power input may include a first differential; mechanism; the first differential mechanism comprising a drive gear and a driven gear; the drive gear meshes with the driven gear which is coaxially connected to the sun gear such that the power input transmits power to the driven gear through the drive gear and indirectly drives the sun gear, causing the planet gear set to operate.

The power input may be arranged outside the sleeve ring and drivingly connected with the sun gear by means of a driving mechanism.

The third one-way clutch and the fourth one-way clutch may be centrifugal one-way clutches.

The apparatus may comprise an auxiliary sun gear co-axially mounted for rotation about the axis;
  a plurality of auxiliary planet pinions, each auxiliary planet pinion being connected for rotation with one of the planet pinions and meshing with the auxiliary sun gear;
  a fifth one-way clutch operative to transmit drive between the power input and the sun gear in one rotational direction only; and,
  a sixth one-way clutch operative to transmit drive between the power input and the auxiliary sun gear in one rotational direction only;
    wherein the fifth one-way clutch and the sixth one-way clutch are configured to engage to transmit drive in opposite rotational directions from one another.

The fifth and sixth one-way clutches thus transmit drive from the power input to one of the sun gear and the auxiliary sun gear depending on the direction of rotation of the power input.

The apparatus may comprise a plurality of auxiliary planet pinions, each auxiliary planet pinion being connected for rotation with a respective one of the planet pinions, and an auxiliary ring gear meshing with the auxiliary planet pinions, wherein the first clutch arrangement is operative to rotationally fix the auxiliary ring gear when the power input rotates in the other rotary direction.

The apparatus is configured to drive the sleeve ring in a first rotary direction of drive in response to the power input and where the first clutch arrangement comprises first and second one-way clutches, the apparatus may comprise an actuator operatively connected between the sleeve ring and at least one of the first and second one-way clutches and configured to disable said at least one of the first and second clutches in response to rotary movement of the sleeve ring in a second rotary direction opposite to the first.

The actuator may be a hub actuator disposed about the axis, the hub actuator comprising:
  a connecting end, being a part of an inner sidewall of the sleeve ring;
  an actuator member, including a seventh one-way clutch pawl;
  a friction clutch operative to transmit drive between the connecting end and the actuator member;
  a suppressor having a unidirectional inner tooth ring at one end which co-operates with the seventh one-way clutch pawl of the actuator and a sleeve at the other end, the sleeve having an open slot and a raised positioning dot at a predetermined position therein; and
  a clutch module disposed about the axis, the clutch module comprising at least an eighth one-way clutch pawl and a concave slot; wherein the eighth one-way clutch pawl is a clutch pawl of at least one of either the first one-way clutch and the second one-way clutch; and the eighth one-way clutch pawl co-operates with the open slot of the suppressor and the positioning dot inside the sleeve locates in the concave slot of the clutch module;
  wherein the suppressor is sleeved on the clutch module such that when the actuator drives the suppressor to turn, the open slot in the sleeve is displaced so as to release (open) or arrest (close) the eighth one-way clutch pawl, thereby controlling the engagement of the eighth one-way clutch pawl with at least the ring gear or the carrier arm.

The apparatus may be disposed about an axle, in which case, the clutch module may be disposed on the axel.

In an alternative embodiment, the apparatus comprises an electromagnetic actuator operative to selectively enable and disable at least one of the first and second one-way clutches in response to an input.

Where the power input is an electric motor, the electromagnetic actuator may be operatively connected with a power supply to the motor, the arrangement being such that when power is supplied to the motor, the electromagnetic actuator is operative to enable said at least one of the first and second one-way clutches and that when power is not supplied to the motor the electromagnetic actuator is operative to disable said at least one of the first and second one-way clutches. The apparatus may comprise:
  a sleeve having an open slot thereon and a raised positioning dot at a predetermined position therein;
  a clutch module disposed on the axis, the clutch module comprising at least an eighth one-way clutch pawl and a concave slot; wherein the eighth one-way clutch pawl is a clutch pawl of at least one of either the first one-way clutch and the second one-way clutch; and the eighth one-way clutch pawl co-operates with the open slot of the suppressor and the positioning dot inside the sleeve co-operates with the concave slot of the clutch module;
  wherein the sleeve is sleeved on the clutch module and releases (opens) or arrests (closes) the eighth one-way clutch through the rotational displacement of the open slot therein, thereby controlling the engagement of the eighth one-way clutch pawl with at least the ring gear or the carrier arm; and an electromagnetic switch coupled to the sleeve and driving the sleeve to rotate; such that when the electromagnetic switch is charged, it drives the sleeve to rotate by means of electromagnetic attraction, which in turn rotates the open slot to release the eighth one-way clutch pawl to an operative position;

the apparatus having means for rotating the sleeve in the opposite direction when the electromagnetic switch is not charged so as to move the sleeve to a position in which it holds the eighth one-way clutch pawl in an inoperative position.

The apparatus may be disposed about an axle, in which case, the clutch module may be disposed on the axel.

The speed changing apparatus may be disposed on an axle and the sleeve ring may be a hub shell.

The speed changing apparatus may include an outer casing, the sun gear, carrier arm, ring gear and sleeve ring, being mounted within the casing for rotation about the axis within the casing.

DETAILED DESCRIPTION OF INVENTION

The speed changing apparatus of the present invention will be fully described with preferred embodiments and accompanying drawings.

In this invention, the planet gear set is also called "planetary gearing" or "planetary gear reducer" on the market. The gear at the center is called "sun gear" and the gear at the outer rim is called "ring gear"; gears revolving around the sun gear are called "planet pinions."

The planet pinions in the planet gear set are grouped in sets of three or four, which are respectively mounted on a carrier arm to keep them in their relative positions. When the sun gear meshes and turns with the planet pinions, they would invariably turn in the opposite direction. However when the ring gear meshes and turns with the planet pinions, they would turn in the same direction. But the ring gear tends to turn in an opposite direction to the carrier arm.

Figure 1:
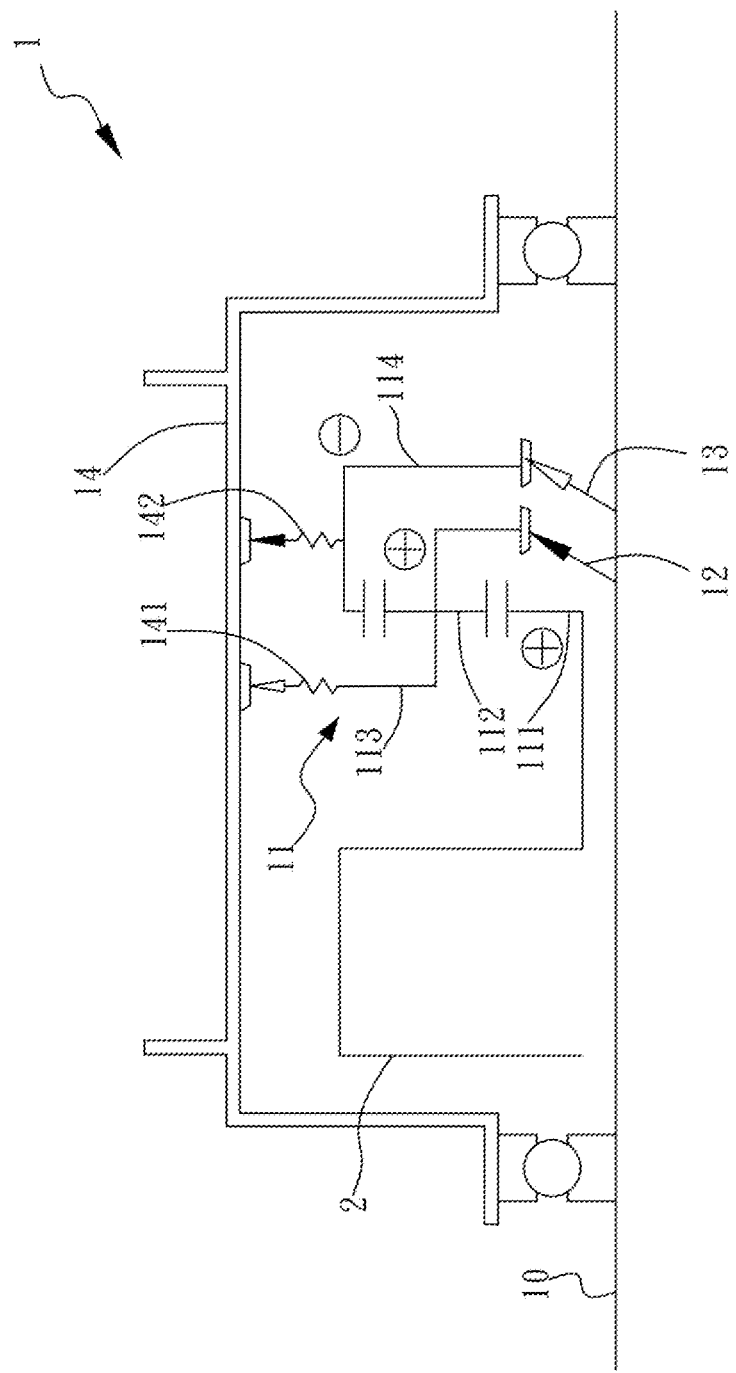
FIG. 1 is a schematic diagram showing a first preferred embodiment of speed changing apparatus according to the invention in high-speed mode.
Figure 2:
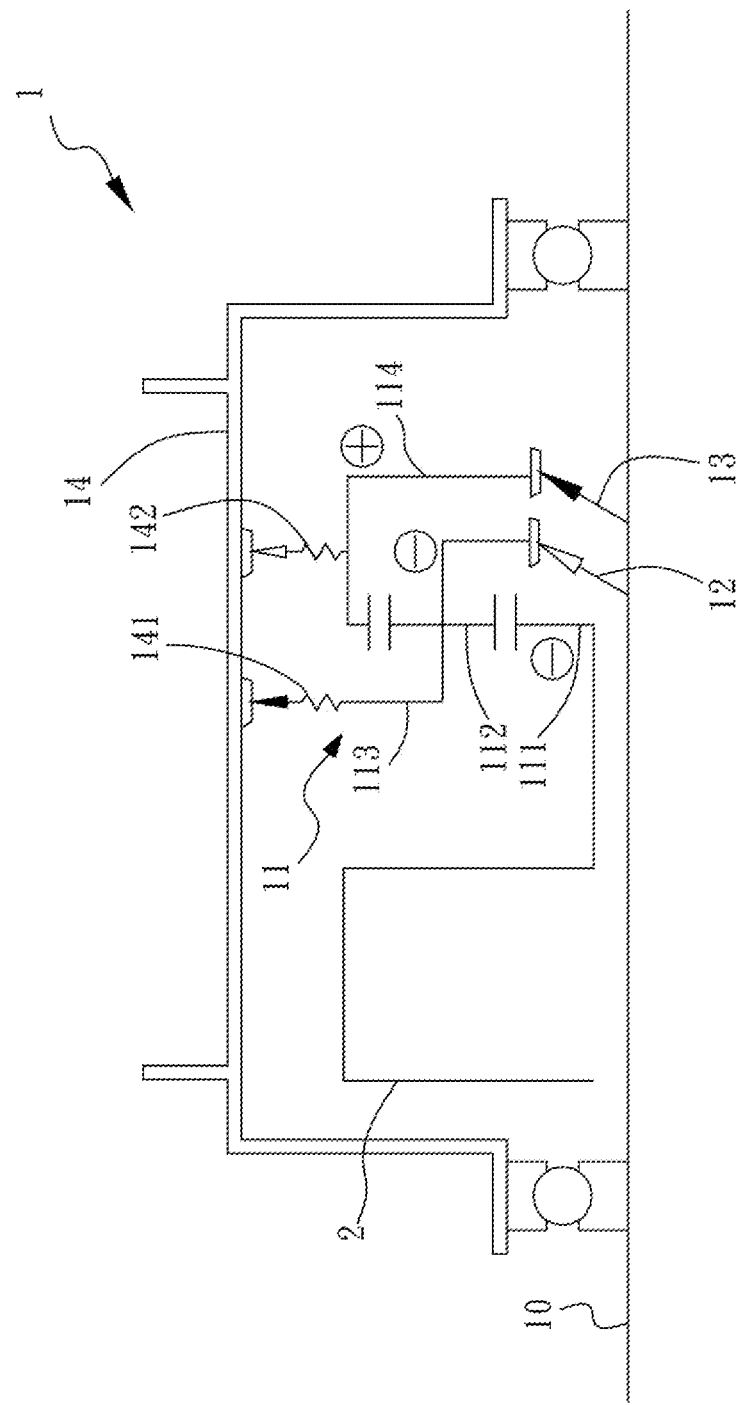
FIG. 2 is a schematic diagram showing the first preferred embodiment of speed changing apparatus according to the invention in low-speed mode.

As shown in FIG. 1 and FIG. 2, the speed changing apparatus 1 is disposed on an axle 10 and transmits power from a power input 2. The axle 10 is fixed and so does not rotate. The speed changing apparatus 1 comprises a planet gear set 11, a first one-way clutch or ratchet 12, a second one-way clutch or ratchet 13, and a hub shell 14. The planet gear set 11 further consists of a sun gear 111, a plurality of planet pinions 112, a carrier arm 113 and a ring gear 114. The hub shell is a substantially cylindrical tubular member which encloses the planet gear set 11 and can also be referred to more generally as a ring sleeve or output ring sleeve.

In the first preferred embodiment of the invention, the power input 2 is installed inside the hub shell 14 and is drivingly connected to the sun gear 111. The hub shell 14 is substantially installed on the driven wheel of a wheeled vehicle such that the driven wheel and the hub shell 14 would rotate coaxially and synchronously. That is, the counterclockwise rotation (−) of the hub shell 14 could drive the driven wheel forward. Conversely, the clockwise rotation (+) of the hub shell 14 could drive the driven wheel backward. Naturally the speed changing apparatus 1 could also be installed in a mirroring direction to change its rotating direction without further elaboration. The invention can also be adapted for use in power tools in which case the hub shell or an equivalent sleeve like component mounted about the planetary gear set can form part of the drive mechanism of the power tool which might be connected with an output shaft of the tool, for example.

In the present embodiment, the first one-way clutch 12 and the second one-way clutch 13 are respectively disposed between the axle 10 and the carrier arm 113 and the axle 10 and the ring gear 114, and the first one-way clutch 12 and the second one-way clutch 13 each have at least one unidirectional pawl provided on the axle 10 to mesh with multiple unidirectional ratchet teeth provided on the carrier arm 113 and the ring gear 114 respectively. The hub shell 14 is sleeved on or surrounds the planet gear set 11. The first and the second one-way clutches 12, 13 are operative in the same direction, i.e. both the first and second one-way clutches are configured to engage when their respective carrier arm 113 or ring gear 114 are rotated in the same rotary direction and to disengage when the carrier arm 113 or the ring gear 114 are rotated in the opposite rotary direction (e.g. clockwise rotation (+)=engage; counterclockwise rotation (−)=disengage) (clockwise rotation is denoted by the "+" sign and counterclockwise rotation is denoted by the "−" in all the drawings and the following description).

The output from the power input 2 (a DC motor) when it rotates clockwise (+) or counterclockwise (−) drives the hub shell 14 through the planet gear set 11, and furthermore the gear set is able to drive the hub shell under different speed modes through either the carrier arm 113 or ring gear 114 depending on the rotary direction of the power input.

In the first preferred embodiment of the invention, a third one-way clutch or ratchet 141 and a fourth one-way clutch or ratchet 142 are respectively provided between an inner side of the hub shell 14 and the carrier arm 113 and between the inner side of the hub shell 14 and the ring gear 114. The third one-way clutch 141 and the fourth one-way clutch 142 each have multiple unidirectional ratchet teeth provided on the inner side of the hub shell 14 to mesh with at least one unidirectional pawl provided on the carrier arm 113 and the ring gear 114 respectively. In this embodiment, the third and the fourth one-way clutch 141, 142 are preferably centrifugal one-way clutches that engage in the same direction (clockwise rotation +=disengage; counterclockwise rotation −=engage). With the installment of centrifugal one-way clutches 141, 142, the unidirectional pawl of the third or the fourth one-way clutch 141, 142 would close (or descend) to disengage from the ratchet teeth automatically when the carrier arm 113 or the ring gear 114 is not turning so that speed change mechanism does not lock and the vehicle become stuck when the rider pulls it in backward direction.

In this embodiment, the first and the second one-way clutch 12, 13 are arranged in such a way that they engage when the carrier arm 113 or the ring gear 114 rotates clockwise (+), and disengage when the carrier arm 113 or the ring gear 114 rotates counterclockwise (−). In other words, when the carrier arm 113 rotates clockwise (+), the first one-way clutch 12 will engage the axle 10 to lock or fix the carrier arm to keep it from turning relative to the axle. Conversely, when the ring gear 114 rotates clockwise (+), the second one-way clutch 13 will engage the axle 10 to lock or fix the ring gear to keep the ring gear 114 from turning relative to the axle. Since the planetary gear set is arranged so that the carrier arm and the ring gear always rotate in opposite directions in response to the power input, only one of the carrier arm and the ring gear will be fixed dependent on the direction of rotation of the power input. In addition, the third and the fourth one-way clutches 141, 142 are respectively arranged in such a way that they disengage when the carrier arm 113 or the ring gear 114 rotates clockwise (+), and engage when the carrier arm 113 or the ring gear 114 rotates counterclockwise (−). In other words, when the carrier arm 113 rotates counterclockwise (−), the third one-way clutch 141 would engage the hub shell 14 such that the carrier arm 113 could drive the turning of hub shell 14. Conversely, when the ring gear 114 rotates counterclockwise (−), the fourth one-way clutch 142 would engage the hub shell 14 such that the ring gear 114 would drive the turning of hub shell 14. As such, when either the carrier arm 113 or the ring gear 114 turns clockwise (+), it is locked to the axle 10 such that no power is transmitted from it to the hub shell 14. Only when the carrier arm 113 or the ring gear 114 turns counterclockwise (−) would the hub shell 14 be driven.

FIG. 1 shows the high-speed transmission path in the first preferred embodiment of the invention. As shown, the speed changing apparatus 1 implements transmission through the power input 2, which could be a DC motor. The DC motor can be operated to drive the sun gear 111 in a clockwise (+) or counterclockwise (−) direction of rotation by changing the flow direction of the input current, thereby forming a differential speed mode. Under the high-speed mode, when the output power from power input 2 rotates in a clockwise direction (+), it would drive the sun gear 111 to rotate clockwise (+), thereby driving the engaged planet pinions 112 to turn counterclockwise (−) and at the same time driving the ring gear 114 to turn counterclockwise (−). At this time, the carrier arm 113 rotates substantially in clockwise (+) mode.

As the carrier arm is being driven to rotate in a clockwise (+) direction, the first one-way clutch 12 operative between the axle 10 and the carrier arm 113 is engaged and the third one-way clutch 141 between the carrier arm and the hub shell is disengaged. The carrier arm 113 is thus is rotationally fixed to the axle by the first one-way clutch 12 and driving disengaged from the hub shell by the third one-way clutch 141 rendering it ineffective in power transmission. Furthermore, the power is transmitted from the planet pinions 112 to the ring gear 114 that they mesh with causing the ring gear to rotate in the counterclockwise (−) direction opposite to the direction of rotation of the carrier arm. This results in the second one-way clutch 13 operative between the axle 10 and the ring gear 114 being disengaged while the fourth one-way clutch 142 operative between the hub shell 14 and the ring gear 114 being engaged. Thus the ring gear 114 is driven to rotated in the counterclockwise (−) direction about the axle and drive is transmitted from the ring gear to the hub shell through the fourth one-way clutch 142, causing hub shell 14 to turn also in the counterclockwise (−) direction which represents a forward direction of the wheel.

FIG. 2 shows the low-speed transmission path in the first preferred embodiment of the invention. Under the low-speed mode, when the output power from power input 2 is in counterclockwise direction (−), the sun gear 111 is driven to rotate counterclockwise (−) thereby driving the engaged planet pinions 112 to turn clockwise (+) and at the same time driving the ring gear 114 to turn clockwise (+). At this time, the carrier arm 113 rotates substantially in counterclockwise (−) mode.

In this mode of operation, the second one-way clutch 13 operative between the axle 10 and the ring gear 114 is engaged and the fourth one-way clutch 142 operative between the hub shell 14 and the ring gear 114 is disengaged. Furthermore, the first one-way clutch 12 operative between the axle 10 and the carrier arm 113 is disengaged while the third one-way clutch 141 operative between the hub shell 14 and the carrier arm 113 is engaged. As a result, the ring gear 114 is rotationally locked to the axle and is drivingly disengaged from the hub shell whilst the carrier arm 113 is driven to rotate in a counterclockwise direction (−) and power is transmitted from the carrier arm 113 to the hub shell to cause the hub shell to turn, also in a counterclockwise direction (−).

The first and second on-way clutches can be operatively disposed between any rotationally fixed component and the carrier arm and the ring gear respectively. For example, one or both of the first and second one-way clutches could be operative between an outer casing of the motor and the carrier arm or ring gear, where the carrier casing is rotationally fixed relative to the axle. It should also be understood that the term "rotationally fixed" or the like refers to a component that does not rotate relative to the axel or to a central axis about which the sun gear, carrier arm, ring gear and sleeve ring are able to rotate when not fixed.

Figure 3:
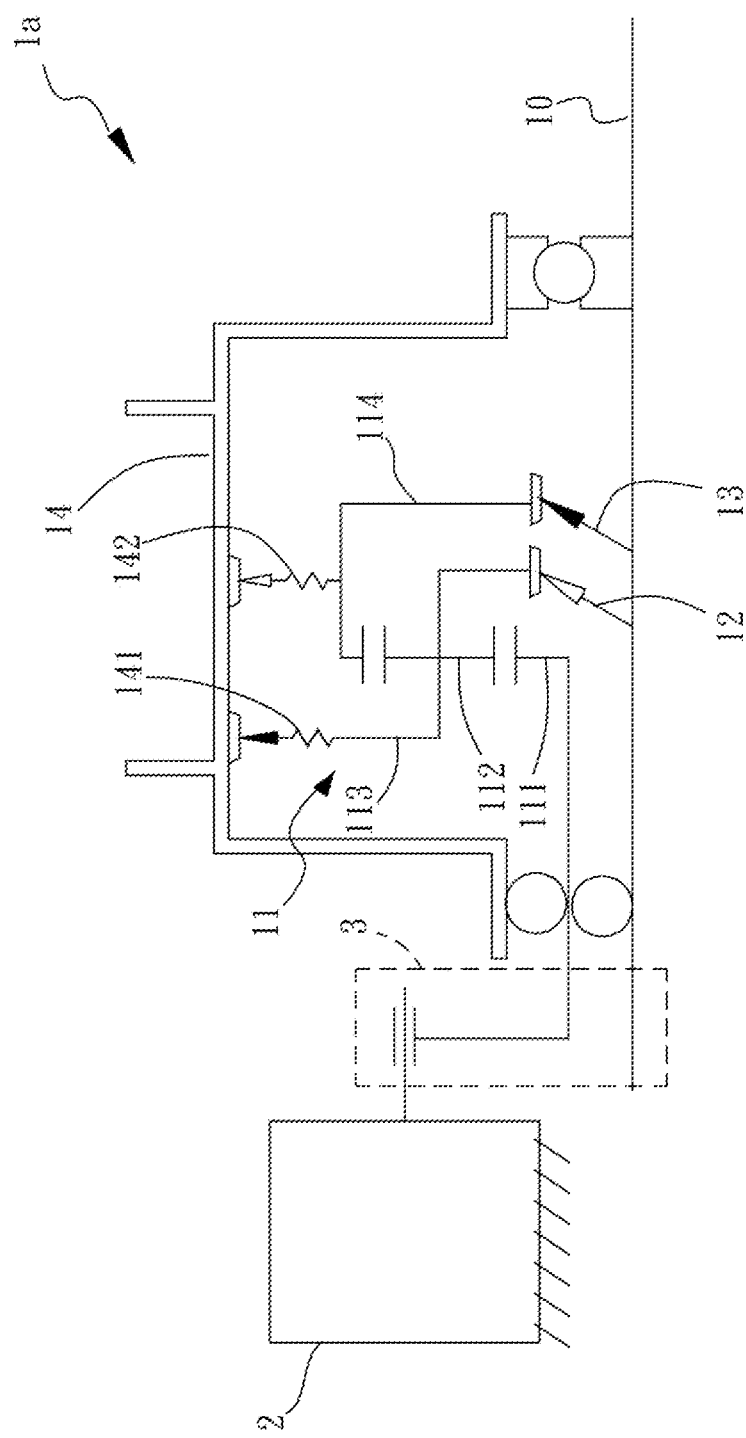
FIG. 3 is a schematic diagram showing a second preferred embodiment of speed changing apparatus according to the invention.

A second preferred embodiment of speed changing apparatus of the invention as shown in FIG. 3 is substantially similar to the first preferred embodiment shown in FIG. 1 and FIG. 2. Thus identical elements and structures will not be reiterated. The differences between the speed changing apparatus in the first and the second preferred embodiments are described below: The power input 2 of the speed changing apparatus 1a is arranged outside the hub shell 14 and is drivingly connected with the sun gear by means of a driving mechanism 3. Said driving mechanism 3 extends into the hub shell 14 and is connected to and drives the sun gear 111, thereby causing the planet gear set 11 to operate. Any suitable driving mechanism 3 may be used such as a belt, a chain, a change gear set and/or a drive shaft. Where the power input is a D.C. motor, the driving mechanism 3 may be configured to drive the sun gear in the same rotational direction as an output shaft of the motor or in the opposite rotational direction.

Figure 4:
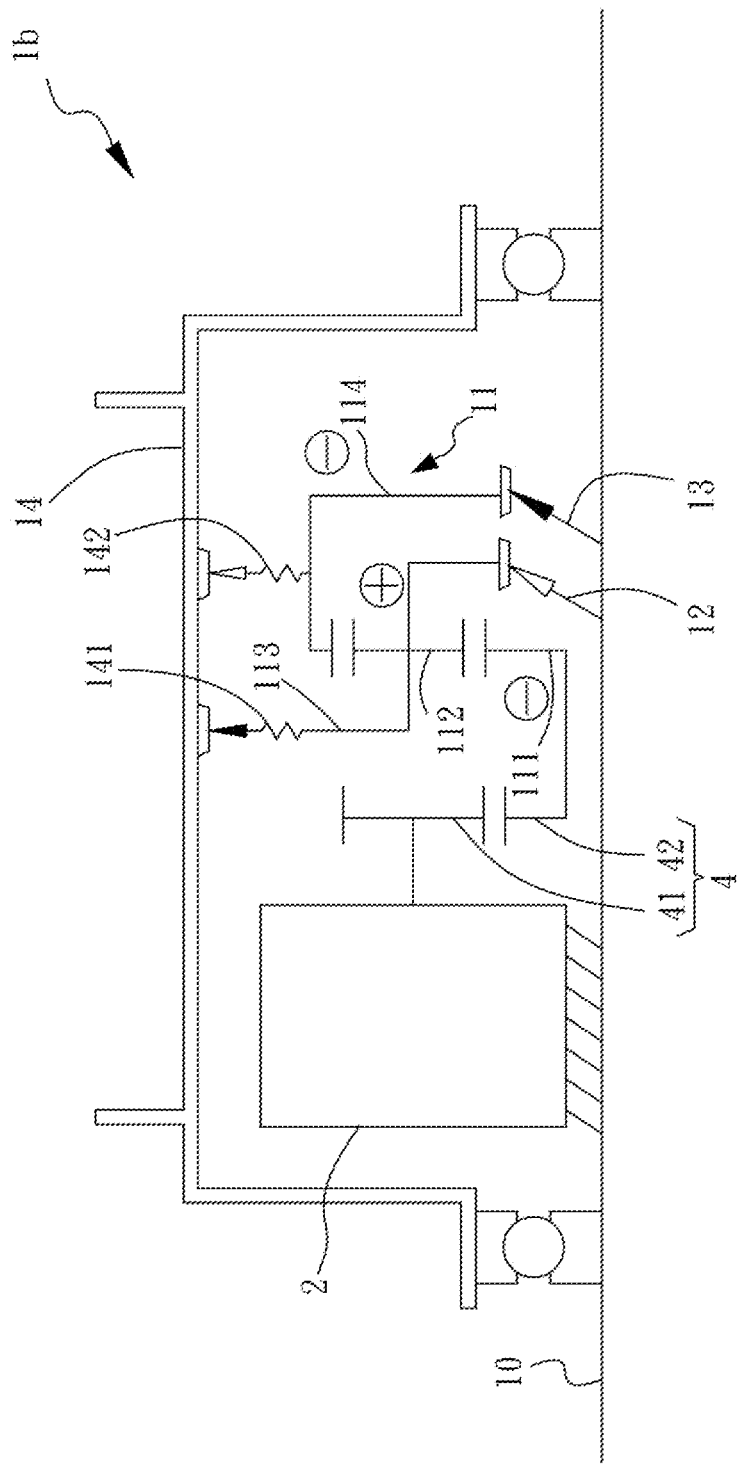
FIG. 4 is a schematic diagram showing a third preferred embodiment of speed changing apparatus according to the invention.

A third preferred embodiment of speed changing apparatus of the invention as shown in FIG. 4 is substantially similar to the first preferred embodiment shown in FIG. 1 and FIG. 2. Thus identical elements and structures will not be reiterated. The differences between the speed changing apparatus in the first and the third preferred embodiments are described below: The power input 2 of the speed changing apparatus 1b is arranged inside the hub shell 14 and securely installed to one side of the axle 10. The power input 2 has a first differential mechanism 4 arranged thereon. Said first differential mechanism 4 consists of a drive gear 41 and a driven gear 42. The drive gear 41 meshes with the driven gear 42. The driven gear 42 is drivingly and coaxially connected to the sun gear 111. Thus the power input 2 transmits power to the driven gear 42 through the drive gear 41 and indirectly drives the sun gear 111, causing the planet gear set 11 to operate to achieve the effect of changing the speed of hub shell 14. In this embodiment, the sun gear is driven to rotate in the opposite rotary direction of that of the output shaft of the motor 2.

Figure 5:
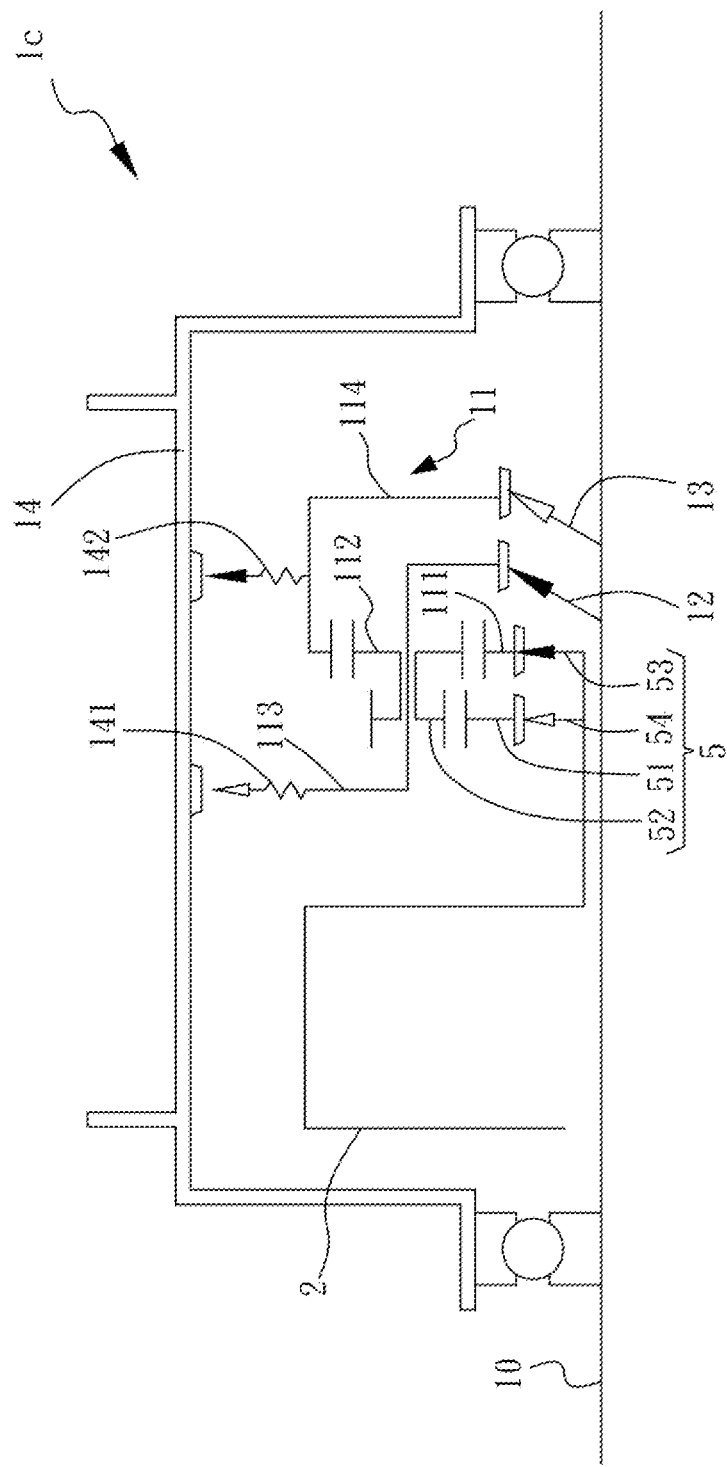
FIG. 5 is a schematic diagram showing a fourth preferred embodiment of speed changing apparatus according to the invention.

A fourth preferred embodiment of speed changing apparatus of the invention as shown in FIG. 5 is substantially similar to the first preferred embodiment shown in FIG. 1 and FIG. 2. Thus identical elements and structures will not be reiterated. The differences between the speed changing apparatus in the first and the fourth preferred embodiments are described below: The speed changing apparatus 1c comprises a further differential mechanism 5, which consists of a first gear or auxiliary sun gear 51, auxiliary planet pinions 52, a fifth one-way clutch 53, and a sixth one-way clutch 54. The auxiliary sun gear 51 is coaxially disposed on the axle 10 adjacent to the main sun gear 111. The auxiliary and main sun gears are independently rotatable about the axle. Each planet pinion 112 is coaxially and securely connected to an auxiliary planet pinion 52 so that the main and auxiliary planet pinions rotate together on the planet carrier 113. Each auxiliary planet pinion 52 meshes with the auxiliary sun gear 51. The fifth one-way clutch 53 is operative to transmit drive between the power input 2 and the main sun gear 111 when the power input 2 is rotated in one direction and the sixth one-way clutch 54 is operative to transmit drive from the power input 2 to the auxiliary sun gear 51 when the power input rotates in the opposite direction.

As the fifth and sixth one-way clutches 53, 54 are configured to transmit drive in opposing rotational directions, the power input 2 is drivingly connected with only one of the sun-gear 111 and the auxiliary sun gear 51 depending on the direction of rotation of the power input 2. Accordingly, when the power input 2 rotates in clockwise (+) or counterclockwise (−) direction, the power is transmitted to one of the main sun gear 111 or the auxiliary sun gear 51 through the fifth one-way clutch 53 or the sixth one-way clutch 54 to give the speed changing apparatus 1c a greater range of possible speed reduction ratios between the high speed mode and the low speed mode. In other words, when the fifth one-way clutch 53 engages the main sun gear 111, the sixth one-way clutch 54 and the auxiliary sun gear 51 are disengaged in a state of idle rotation. Conversely, when the sixth one-way clutch 54 engages the auxiliary sun gear 51, the fifth one-way clutch 53 and the main sun gear 111 are disengaged in a state of idle rotation. As such, in this embodiment, the differential ratio of the apparatus between the clockwise rotation and the counterclockwise rotation of the power input 2 could be changed by the difference in tooth number between the sun gear 111 and the auxiliary sun gear 51 and that between the auxiliary planet pinions 52 and the main planet pinion 112. This will give the speed changing apparatus of the invention more flexibility in achieving differential high and low speed ratios instead of relying solely on the basic planet gear set 11 as used in the previous embodiments.

Figure 6:
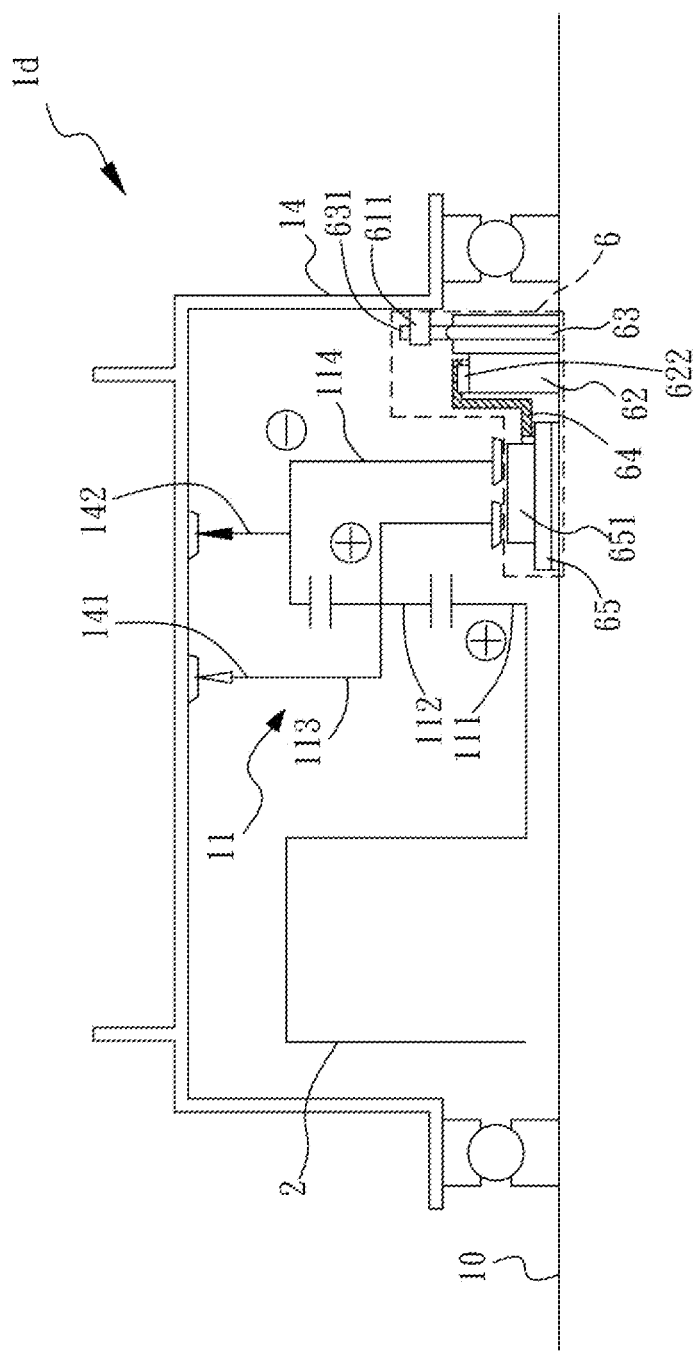
FIG. 6 is a schematic diagram showing a fifth preferred embodiment of speed changing apparatus according to the invention

The fifth preferred embodiment of speed changing apparatus of the invention as shown in FIG. 6 is substantially similar to the first preferred embodiment shown in FIG. 1 and FIG. 2. Thus identical elements and structures will not be reiterated. The differences between the speed changing apparatus in the first and the fifth preferred embodiments are described below: The speed changing apparatus 1d further comprises a hub actuator 6 disposed on the axle 10. The hub actuator 6 is connected between the hub shell and at least one of the first one-way clutch 12 and the second one-way clutch 13 as shown in the first embodiment and is operative to allow the drive wheel disposed on hub shell 14 to be rotated in a reverse direction (that is with the hub shell rotating in clockwise direction +), for example by pushing the vehicle backwards, without the speed change apparatus becoming locked. With the arrangement of a hub actuator 6 in this embodiment, the third and the fourth one-way clutches 141, 142 could be regular one-way clutches, instead of centrifugal one-way clutches.

Referring to FIGS. 6, 7, 8 and 9, the hub actuator 6 consists of a connecting end 61, an actuator 62, a friction clutch 63, a one-way clutch pawl suppressor 64, and a clutch module 65. In the fifth preferred embodiment of the invention, the friction clutch 63 is a C-shaped actuating spring. The connecting end 61 forms a part of the inner sidewall of the hub shell 14 with a protruding clamp fixation end 611 to secure the friction clutch 63. The connecting end 61 may form the side wall of the hub shell or it could be a separate component mounted to the side wall. The actuator 62 includes a coupling groove 621 and a seventh one-way clutch pawl 622. The friction clutch 63 is sleeved in the coupling groove 621 with an extended fixed end 631 clamping to the protruding clamp fixation end 611 disposed on the inner sidewall of the hub shell 14. The friction clutch 63 provides a predetermined level of friction between the connecting end 61 and the actuator 62 such that when the connecting end 61 turns, it propels the actuator 62 to turn through the friction created by the friction clutch 63. However once the actuator 62 is prevented from rotating, the friction clutch 63 will slip such that the connecting end 61 can keep on turning without further rotation of the actuator 62. In this embodiment, the friction clutch 63 is a C-shaped actuating spring. However, any suitable friction clutch arrangement can be used, For example, in another embodiment, the friction clutch 63 can be a friction disc sandwiched between the actuator 62 and the connecting end 61, such as a rubber washer that can similarly provide the function of a fiction clutch 63.

The suppressor 64 has a unidirectional inner tooth ring 641 at one end, which co-operates with the seventh one-way clutch pawl 622 of the actuator 62. The suppressor 64 has a sleeve 642 at the other end which has an open slot 6421 thereon. A raised positioning dot or lug 6422 is disposed at a predetermined position in the sleeve 642. The clutch module 65 is arranged on the axle 10 and consists of at least one eighth one-way clutch pawl 651 and a concave slot 652. The eighth clutch pawl 651 may be the pawl of either the first one-way clutch 12 or the second one-way clutch 13 as shown in FIG. 1, or there could be two eighth one-way clutch pawls 651 that are respectively the pawls of the first one-way clutch 12 and the second one-way clutch 13 as shown in FIG. 1. In other words, the speed changing apparatus as shown in FIG. 6~FIG. 9 has first and second one-way clutches that are respectively disposed between the axle 10 and the carrier arm 113 and between the axle 10 and the ring gear 114 but one or both of the pawls of the first one-way clutch and second one-way clutch comprises a pawl 651 controlled by the hub actuator 6.

The eighth one-way clutch pawl 651 cooperates with the open slot 6421 of the suppressor 64, while the positioning dot 6422 in the sleeve 642 cooperates with the concave slot 652 in the clutch module 65. The suppressor 64 is sleeved on the clutch module 65. When the seventh one-way clutch pawl 622 engages the inner ring tooth 641 of the suppressor 64, the actuator 62 drives the suppressor 64 to turn such that the open slot 6421 in the sleeve 64 is rotated so as to release (open) or arrest (close) the one-way clutch pawl 651, thereby controlling the engagement of the eighth one-way clutch pawl or pawls 651 with at least the ring gear 114 or the carrier arm 113.

The seventh one-way clutch pawl 622 and the eighth one-way clutch pawl 651 are elastic unidirectional pawls operative to engage in different rotational directions. The eighth one-way clutch pawl 651 could mesh with either the ring gear 114 or the carrier arm 113 as part of the first or second one-way clutch. When the power input 2 stops operation and furthermore the drive wheel disposed on the hub shell 14 is pulled backward (with the connecting end 61 rotating clockwise (+) in this embodiment), the seventh one-way clutch pawl 622 engages the inner ring tooth 641 of the suppressor 64 such that the sleeve 642 is turned and displaced a certain degree and contacts a guide angle notch 6511 of the eighth one-way clutch pawl 651 to close the pawl (move it to an inoperative position) and prevent it engaging the carrier arm 113 or the ring gear 114. As such, the vehicle could be backed up with the connecting end 61 of the hub shell 14 turning clockwise (+) without being stopped by the locking of the planet gear set 11.

That is, when the drive wheel on the hub shell 14 backs up causing the hub shell 14 to turn clockwise (+), the clamping fixation end 611 of the connecting end 61 disposed on the inner wall of hub shell 14 would drive the actuator 62 to turn clockwise through the friction clutch 63. Meanwhile, the seventh one-way clutch pawl 622 drives the inner ring tooth 641 of the suppressor 64 to turn. Furthermore, the positioning dot 6422 on the sleeve 642 would move from a lower endpoint 6521 to an upper endpoint 6522 in the concave slot 652 of the clutch module 65 such that the part of the sleeve 642 adjacent to the open slot 6421 would displace by rotating clockwise, using a guide angle notch 6511 disposed on top of the eighth one-way clutch pawl 651 to guide the sleeve 642 to depress the eighth one-way clutch pawl 651 along the inclined plane of the guide angle notch 6511 until the eighth one-way clutch pawl 651 is located inside the sleeve 642 and covered by it (with the pawl closing down). With the pawl in the in-operative closed position, there will be no driving connection between the eighth one-way clutch pawl 651 and the ring gear 114 (and/or the carrier arm 113). Because the friction clutch 63 is simply sleeved inside the coupling groove 621, once the positioning dot 6422 on the sleeve 642 moves to the upper endpoint 6522, the friction clutch 63 would slip in the coupling groove 621 of the actuator 62 without driving the actuator 62 to rotate continuously if the connecting end 61 of the hub shell 14 continues to rotate clockwise (+).

When the power input 2 is operative and rotates either clockwise (+) or counterclockwise (−) to shift gear, the hub shell 14 is always driven forward in counterclockwise direction (−). At this time, the clamping fixation end 611 of the connecting end 61 disposed on the inner wall of hub shell 14 would drive the friction actuator 63 to turn counterclockwise (−), causing the seventh one-way clutch pawl 622 on the actuator 62 to turn idly in the inner ring tooth 641 of the suppressor 64. The small friction between the two gives the sleeve 642 a little energy to turn counterclockwise (−). Coupled with the upward elasticity of the eighth one-way clutch pawl 651 which drives the positioning dot 6422 on the sleeve 642 to move from the upper endpoint 6522 to the lower endpoint 6422 inside the concave slot 652, the part of the sleeve 642 at its open slot 6421 is displace in counterclockwise direction, causing the eighth one-way clutch pawl 651 to be released (with the pawl opening up) so that the first and/or second one-way clutch is able to function normally to lock the ring gear and/or the carrier arm to the axle such that changing direction of rotation of the power input 2, coupled with the working of the ring gear 114 or the carrier arm 113 result in a shift between the high-speed mode and the low-speed mode as described above.

Figure 7:
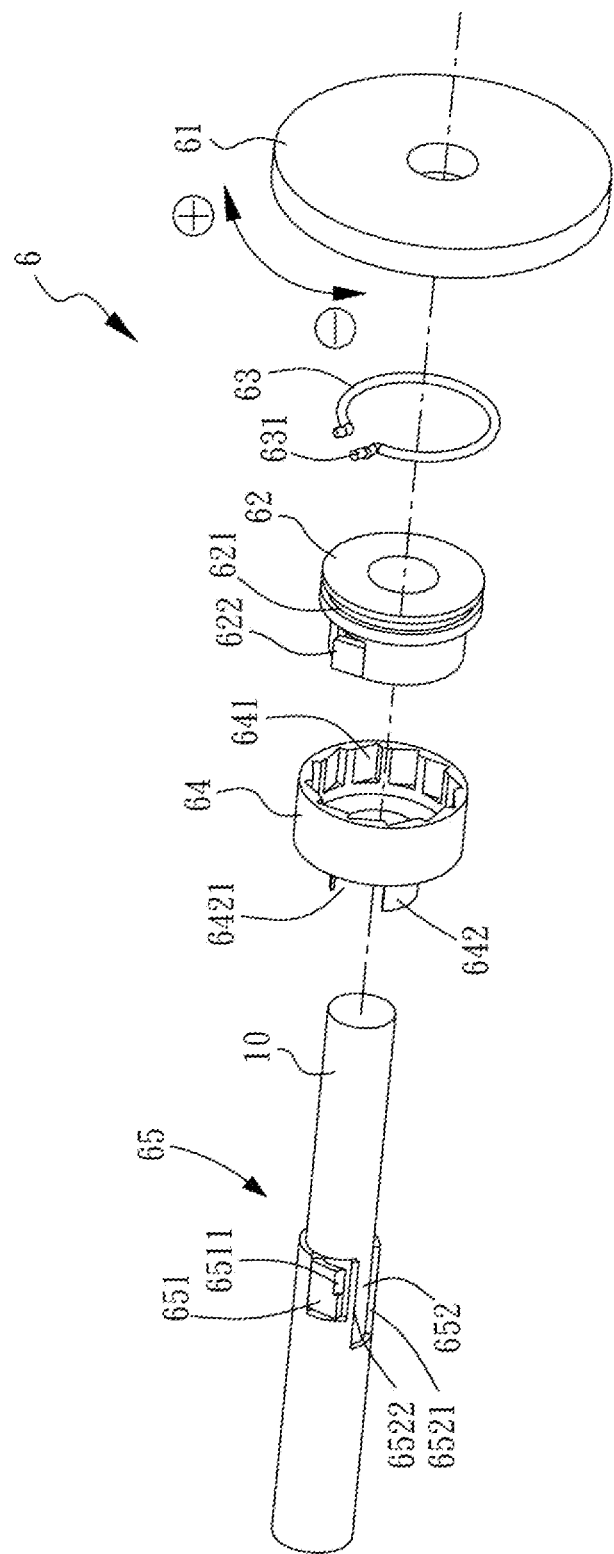
FIG. 7 is an exploded, perspective diagram of a hub actuator forming part of the fifth preferred embodiment of speed changing apparatus according to the invention.
Figure 8:
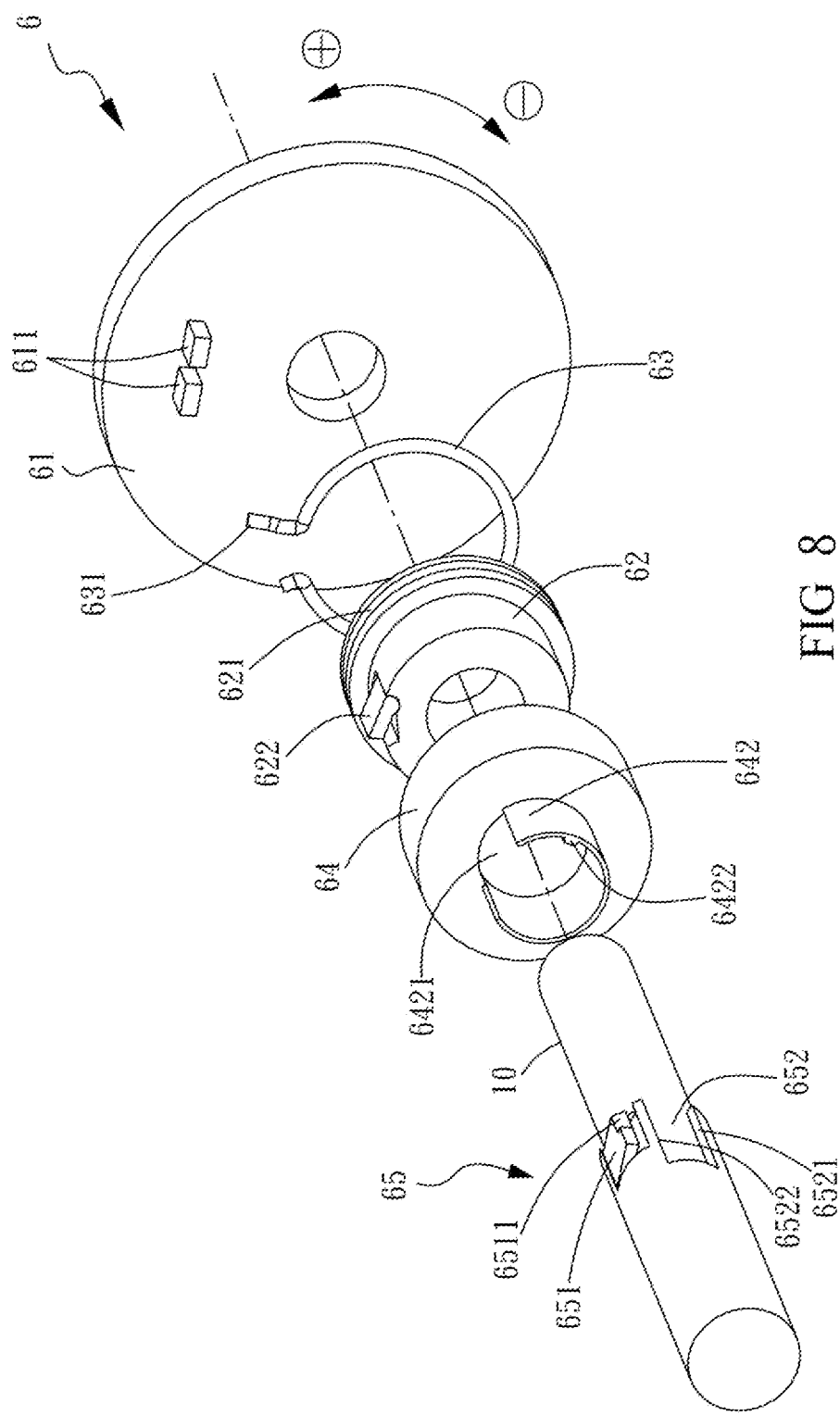
FIG. 8 is an exploded, perspective diagram of the hub actuator in the fifth preferred embodiment of speed changing apparatus according to the invention from another view.
Figure 9:
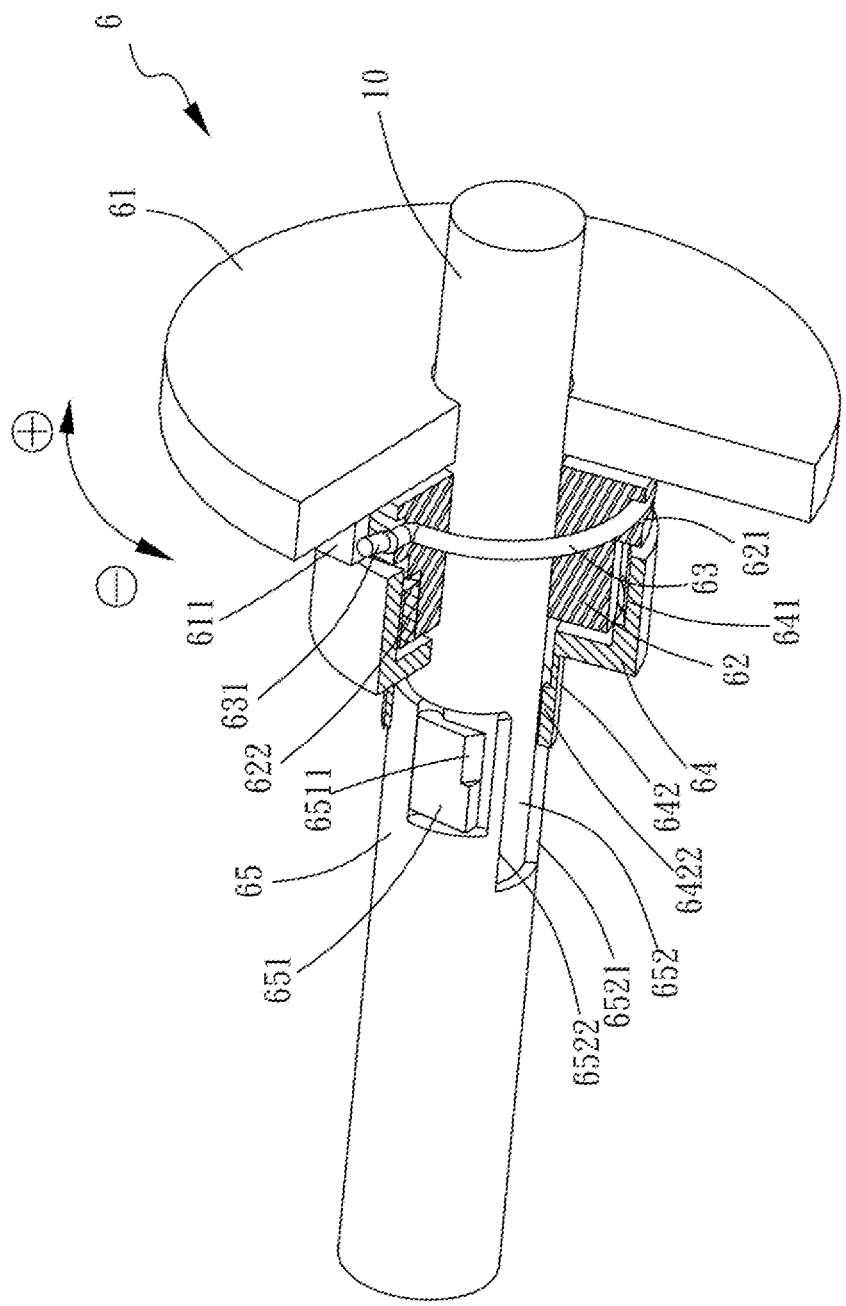
FIG. 9 is a sectional perspective diagram of the hub actuator in the fifth preferred embodiment of speed changing apparatus according to the invention.
Figure 10:
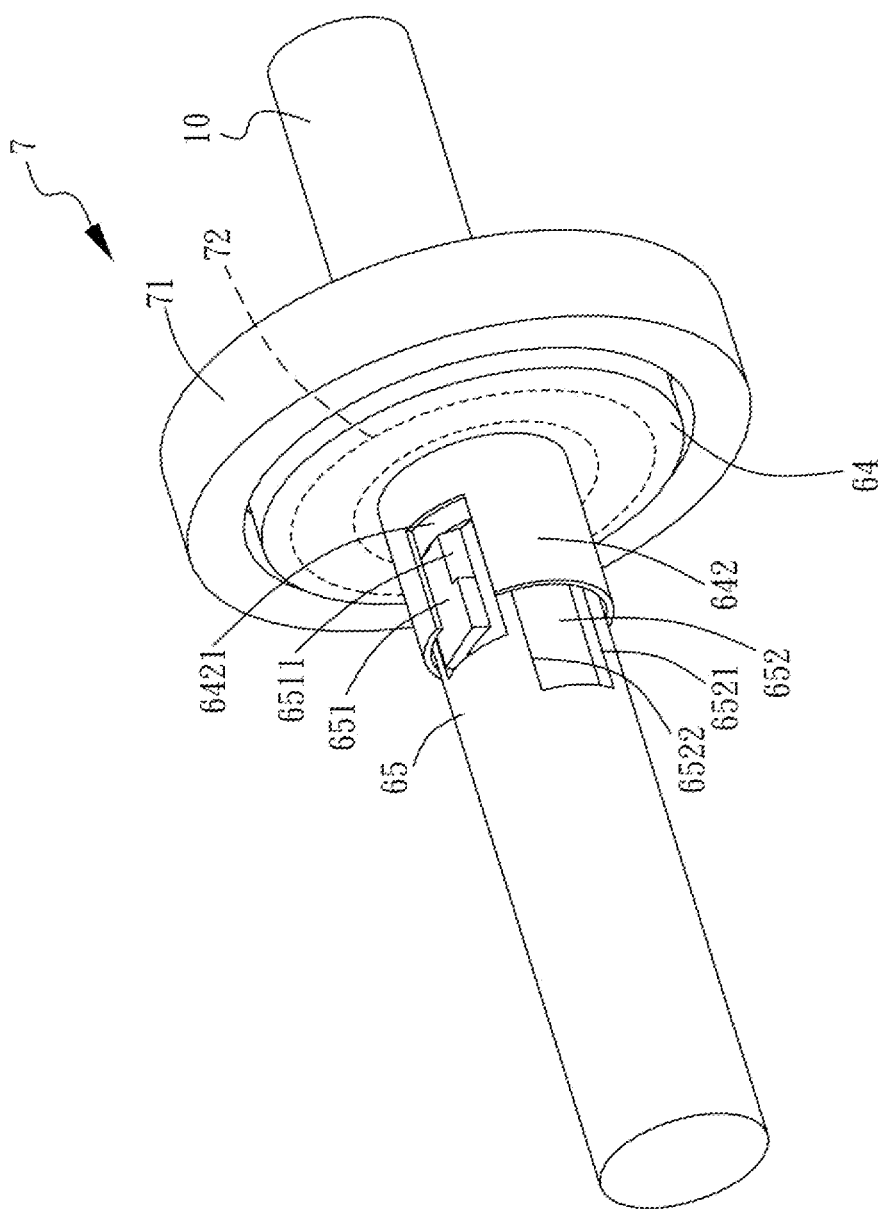
FIG. 10 is a perspective diagram of an electromagnetic switch forming part of a sixth preferred embodiment of speed changing apparatus according to the invention.
Figure 11A:
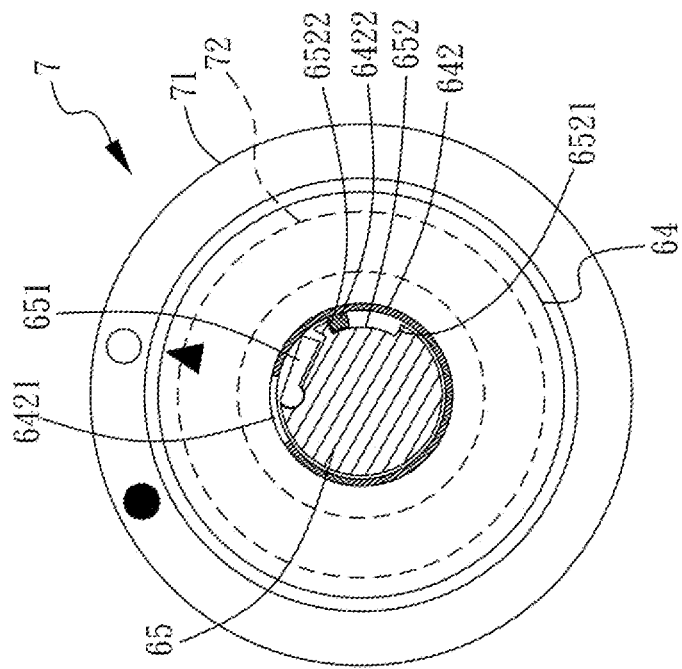
FIG. 11A is a schematic diagram of the electromagnetic switch in the sixth preferred embodiment of speed changing apparatus according to the invention in "on" position.
Figure 11B:
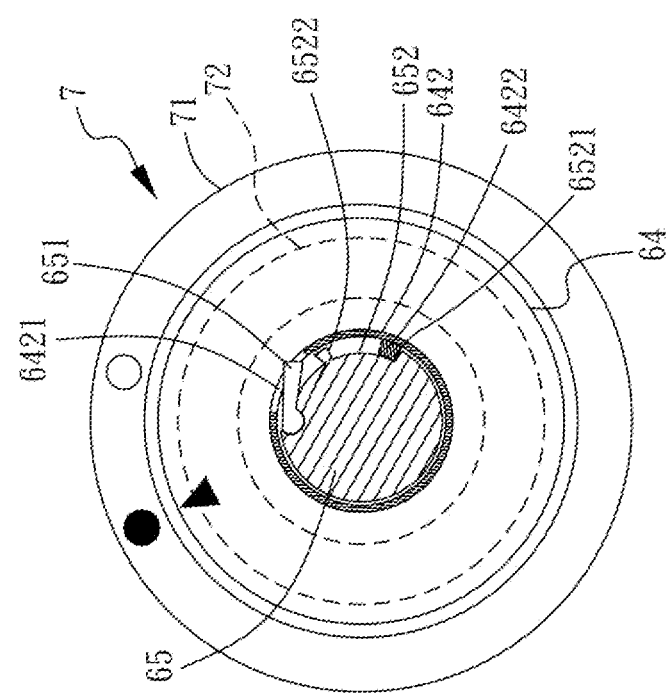
FIG. 11B is a schematic diagram of the electromagnetic switch in the sixth preferred embodiment of speed changing apparatus according to the invention in "off" position.

A sixth preferred embodiment of speed changing apparatus of the invention as shown in FIGS. 10, 11A and 11B is substantially similar to the fifth preferred embodiment shown in FIGS. 7, 8 and 9. Thus identical elements and structures will not be reiterated. The differences between the speed changing apparatus in the fifth and the sixth preferred embodiments are described below: An electromagnetic switch 7 is used in place of the actuator 62 and the friction clutch 63 to rotate the sleeve 642 of the suppressor 64 and control the opening/closing of the eighth one-way clutch pawl 651 by electromagnetic means. The electromagnetic switch 7 further consists of an electromagnetic coil 71 and at least a magnet 72. In the sixth preferred embodiment, the magnet 72 of the electromagnetic switch 7 is disposed inside the suppressor 64 and corresponds to the electromagnetic coil 72.

As shown in FIG. 11A, the power input 2 charges the electromagnetic switch 7 (ON: ●) through logic control to release the eighth one-way clutch pawl 651 by means of electromagnetic attraction. As shown in FIG. 11B, the shutdown of power input 2 cuts off power to the electromagnetic switch 7 (OFF: ○) or gives it opposite electromagnetic force so that the eighth one-way clutch pawl 651 is moved to the depressed, closed position.

When the electromagnetic switch is charged, it drives the sleeve to rotate by means of electromagnetic attraction, which in turn rotates the open slot to release the eighth one-way clutch pawl to open position. When the electromagnetic switch is cut off power, the open slot on the sleeve will rotate to hold the eighth one-way clutch pawl in a closed or retracted position to prevent operation of the first and/or second one-way clutch.

That is, the electromagnetic switch 7 and the power input 2 work synchronously. When the power input 2 is on, a preset current is simultaneously sent to the electromagnetic coil 71 to produce magnetic force with the magnet 72. The magnetic force causes the sleeve 642 of the suppressor 64 to turn a certain degree, which enables the positioning dot 6422 to move from the upper endpoint 6522 to the lower endpoint 6521 to cause the rotation and displacement of the open slot 6421, thereby releasing the eighth one-way clutch pawl 651 (with the pawl opening up). This allows the first/and or second one way clutch to operate normally as described above.

The shutdown of power input 2 simultaneously cuts power to the electromagnetic coil 71. At this time, the suppressor 64 would cause the sleeve 642 to turn using an elastic recoil mechanism (e.g. a torsion spring installed inside the suppressor 64). As such, the positioning dot 6422 is moved from the lower endpoint 6521 to the upper endpoint 6522, causing displacement of the open slot 6421, which enables the sleeve 642 to press down the eighth one-way clutch pawl 651 and covers it (with the pawl closing down). As such, the first and/or second one-way clutch of which the eighth one-way clutch pawl is a part is effectively disabled preventing its engagement such that the ring gear and/or the carrier arm cannot be locked to the axial.

Figure 12:
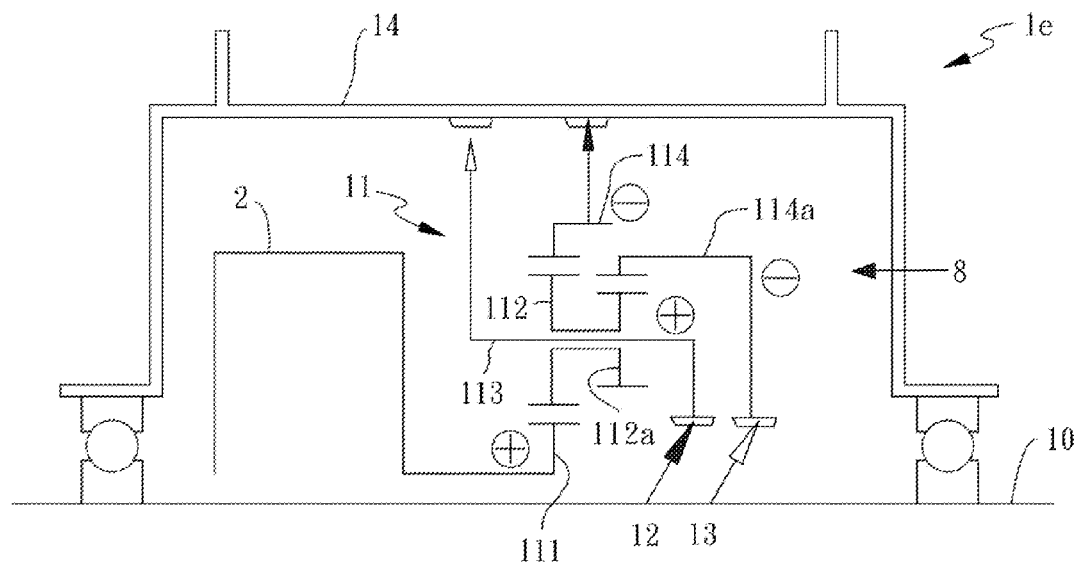
FIG. 12 is a schematic diagram showing a seventh preferred embodiment of speed changing apparatus according to the invention in high-speed mode.
Figure 13:
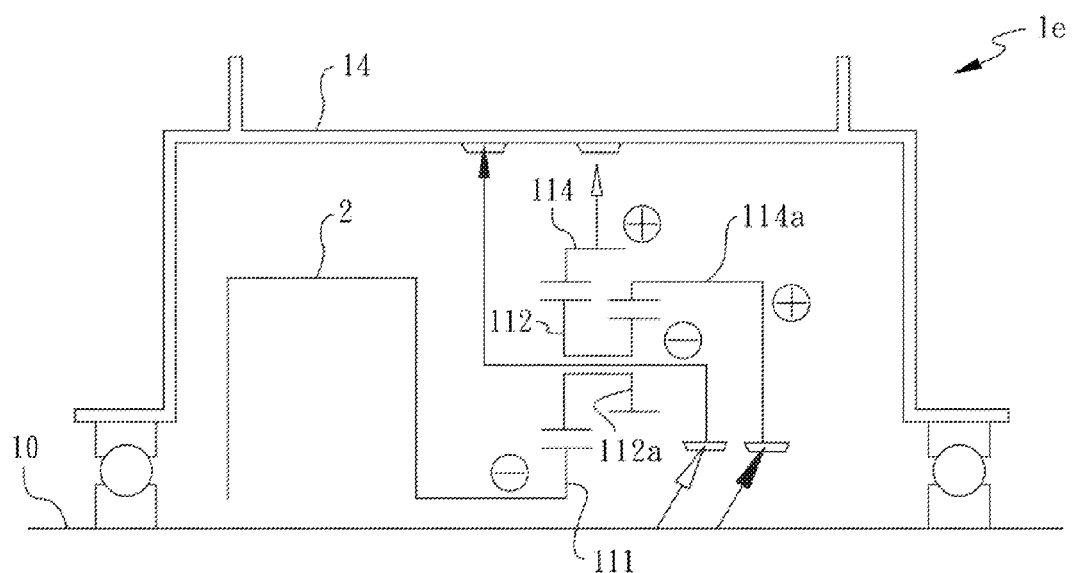
FIG. 13 is a schematic diagram showing the seventh preferred embodiment of speed changing apparatus according to the invention in low-speed mode.

A seventh preferred embodiment of speed changing apparatus of the invention as shown in FIGS. 12 and 13 is substantially similar to the first preferred embodiment shown in FIG. 1 and FIG. 2. Thus identical elements and structures will not be reiterated. The differences between the speed changing apparatus in the first and the seventh preferred embodiments are described below: The speed changing apparatus 1e comprises a further differential mechanism 8 which consists of auxiliary planet pinions 112a and an auxiliary ring gear 114a. Each of the planet pinions is rotatably mounted to the carrier arm 113 and comprises a main planet pinion 112 and an auxiliary planet pinion 112a connected to and rotatably fast with the main planet pinion. The main planet pinions 112 and the auxiliary planet pinions 112a may have a different number of teeth from each other. The main ring gear 114 surrounds and meshes with the main planet pinions 122 whilst the auxiliary ring gear 114a surrounds and meshes with the auxiliary planet pinions 112a. The main ring gear and the auxiliary ring gear may have a different number of teeth from each other. The second one way clutch 13 is operative between the axle 10 and the auxiliary ring gear 114a and engages to lock the auxiliary ring gear 114a rotationally to the axle when the auxiliary ring gear is driven to rotate in a clockwise (+) direction. The fourth one-way clutch is operative between the main ring gear 114 and the hub shell 14 and is configured to engage and transmit drive from the main ring gear 114 to the hub shell when the main ring gear is driven to rotate in a counterclockwise (−) direction.

FIG. 12 shows the seventh embodiment of the speed changing apparatus 1e in a high speed mode of operation in which the power input is rotating in a clockwise (+) direction causing the sun gear 11 to be driven in a clockwise (+) direction. The main and auxiliary planet pinions 112, 112a are rotated counterclockwise (−) by the sun gear and cause both the main and auxiliary ring gears 114, 114a to rotate in a counterclockwise (−) direction whilst the carrier arm 113 is driven to rotate in a clockwise (+) direction. The first one way clutch 12 engages to lock the carrier arm to axle so that the carrier arm is rotational fixed relative to the axle. The second one-way clutch 13 does not engage so that the auxiliary ring gear 114a is free to rotate in a counter clockwise direction in an idle mode. The third one-way clutch 141 between the carrier arm 113 and the hub assembly 14 is disengaged whilst the fourth one-way clutch between the main ring gear 114 and the hub shell engages to transmit drive from the main ring gear to the hub shell, which is driven to rotate in a forward, counterclockwise (−) direction. Thus the hub shell 14 is driven by motor through the planetary gear set in which the sun gear 11 is the input, the main ring gear the output and the carrier arm 113 fixed.

FIG. 13 shows the seventh embodiment of the speed changing apparatus 1e in a low speed mode of operation in which the power input is rotating in a counterclockwise (−) direction causing the sun gear 11 to be driven in a counterclockwise (−) direction. The main and auxiliary planet pinions 112, 112a are rotated clockwise (+) by the sun gear which drives both the main and auxiliary ring gears 114, 114a to rotate in a clockwise (+) direction whilst the carrier arm 113 is driven to rotate in a counterclockwise (−) direction. The first one-way clutch 12 is disengaged allowing the carrier arm rotate 113 about the axle. The second one-way clutch 13 engages to lock auxiliary ring gear 114a to the axle so that the auxiliary ring gear is rotationally fixed relative to the axle. The third one-way clutch 141 between the carrier arm 113 and the hub assembly 14 is engaged so that drive is transmitted from the carrier arm to the hub shell 14, which is rotated in a forward, counterclockwise (−) direction. The fourth one-way clutch 142 between the main ring gear 114 and the hub shell is disengaged so that the main ring gear 114 is free to rotate about the axle in an idle mode. Thus the hub shell 14 is driven by motor through the planetary gear set in which the sun gear 11 is the input, the auxiliary ring gear is fixed and the carrier arm 113 is the output.

The advantage of the speed changing device in accordance with the seventh embodiment is that it allows for a greater flexibility in setting the relative ratios in the high speed and low speed modes of operation as the gear ratio between the ring gear and the planet pinions can be different in each mode. For example, in one embodiment the sun gear 111 has 25 teeth, the main planet pinions 112 each have 60 teeth, the auxiliary planet pinions each have 20 teeth, the main ring gear 114 has 145 teeth and the auxiliary ring gear has 105 teeth. This gives the following gear reduction ratios in the high and low speed modes:

Gear reduction ratio in high speed mode (high gear): 5.8 (145T/25T=5.8)

Gear speed reduction ratio in low speed mode (low gear): 13.6 (105T/(25T/60T*20T)+1=13.6)

Figure 14:
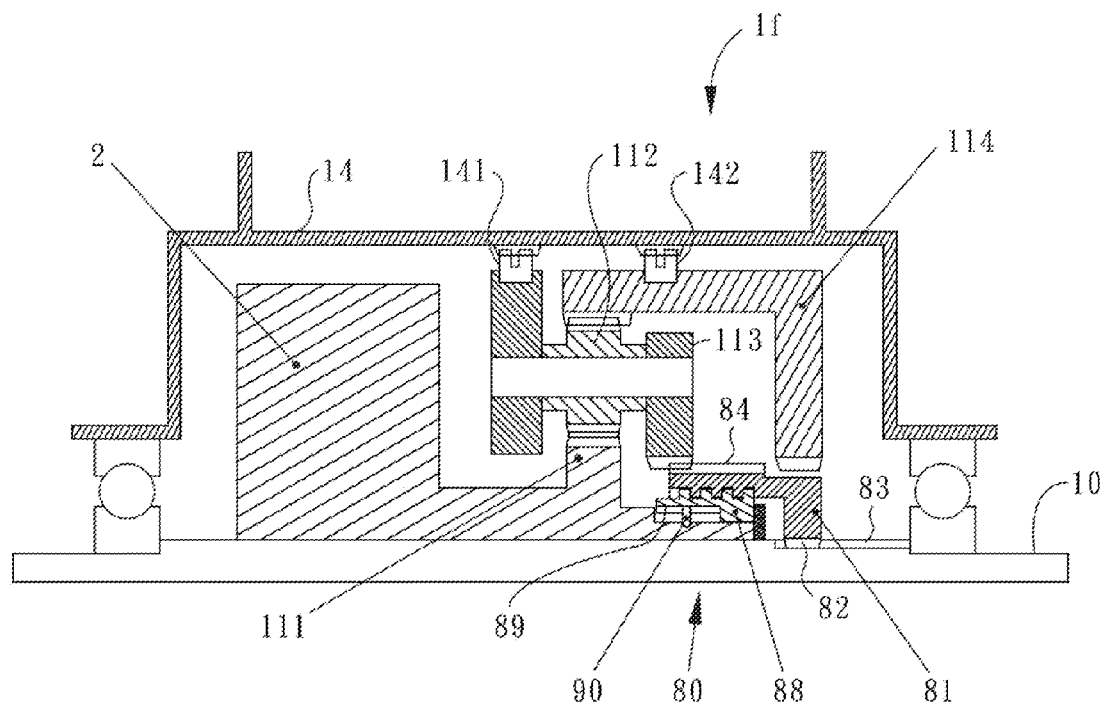
FIG. 14 is a schematic diagram showing in cross-section an eighth preferred embodiment of speed changing apparatus according to the invention in high-speed mode.
Figure 15:
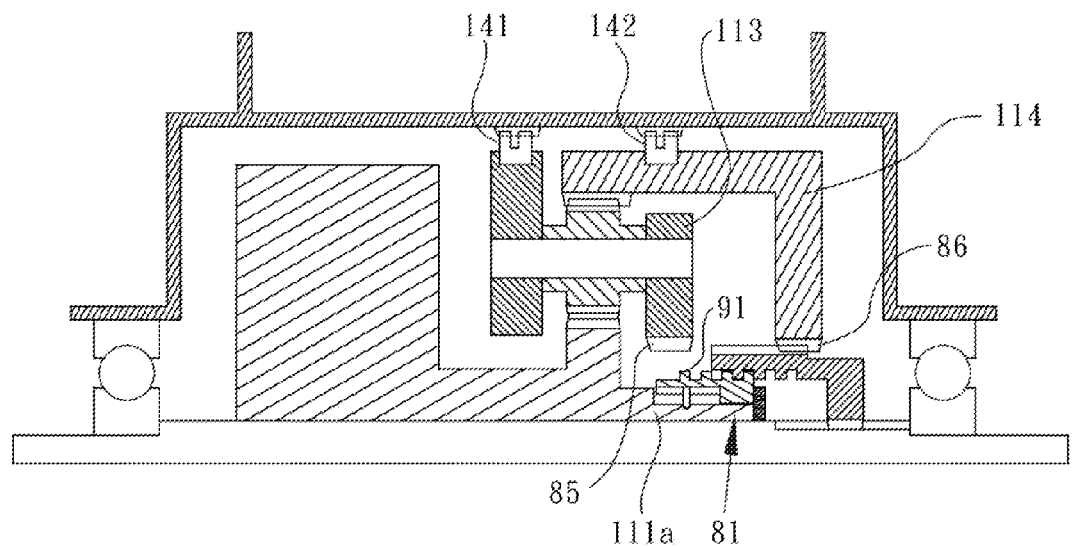
FIG. 15 is a schematic diagram showing the eighth preferred embodiment of speed changing apparatus according to the invention in low-speed mode.

An eighth preferred embodiment of speed changing apparatus if of the invention as shown in FIGS. 14 and 15 is substantially similar to the first preferred embodiment shown in FIG. 1 and FIG. 2. Thus identical elements and structures will not be reiterated. The differences between the speed changing apparatus in the first and the eighth preferred embodiments are described below: rather than a first and second one-way rotary clutches, the speed changing apparatus if comprises a slide clutch mechanism 80 for locking either the carrier arm 113 or the ring gear 114 to the axle in dependence on the direction of rotation of the power input.

The slide clutch mechanism 80 comprises a tubular sliding clutch member 81 which is slidably but non-rotatably mounted about the axle. Any suitable arrangement for mounting the sliding clutch member to the axle can be used. In the present embodiment, the sliding member has internal splines 82 that engage with corresponding splines 83 on the outer surface of the axle. The sliding clutch member has external splines 84 on an outer surface. Corresponding splines or teeth or other formations 85, 86 are provided on the carrier arm 113 and the ring gear 114 respectively. The sliding clutch member 81 is movable between a first position as shown in FIG. 14, in which the external splines 84 engage the corresponding splines or teeth 85 on the carrier arm 113 to lock the carrier arm to the axle to prevent it rotating about the axle, and a second position as shown in FIG. 15, in which the external splines 84 engage the corresponding splines or teeth 86 on the ring gear 114 to lock the ring gear to the axle to prevent it from rotating about the axle. Movement of the sliding clutch member between the first and second positions is controlled by a clutch actuator 87 in response to rotational movement of the sun gear 111 when driven by the power input 2. The clutch actuator 87 comprises a cylindrical actuator member 88 having a stepped internal bore 89 is mounted about an axial spur 111a of the sun gear 111. The inner surface of the actuator member in the smaller diameter region of the bore is a snug sliding fit about the spur and a friction spring 90 is mounted between the spur and the inner surface of the actuator member in a larger diameter region of the stepped bore. The actuator member 88 is connected to the sliding clutch member 81 by means of a screw thread 91 which is configured to move the clutch sliding member to the left (as shown) towards the first position when the actuator member is rotated in a clockwise (+) direction and to the right (as shown) towards its second position when the actuator member is rotated in the opposite counterclockwise (−) direction.

When the sun gear 111 is rotated by the power input 2 in a clockwise (+) direction, the actuator member is driven to rotate in a clockwise (+) direction through the friction spring 90. Clockwise movement of the actuator member 88 is transferred to the sliding clutch member 81 through the screw thread which causes the sliding clutch member 81 to move to the left (as shown) to the first position to lock the carrier arm to the axle so that the carrier arm is fixed against rotation about the axle. In this position, the external splines 84 of the sliding clutch member are disengaged from the splines or teeth 86 on the ring gear which is free to rotate about the axle. Once the sliding clutch member 81 has moved fully to the left, the friction spring 90 slips relative to at least one of the actuator member and the sun gear spur to allow the sun gear 111 to rotate relative to the actuator member 88 whilst holding the sliding clutch member in the first position. When the sun gear 111 is rotated in a counterclockwise (−) direction by the power input, the clutch actuator member 88 is also rotated counterclockwise (−) through the friction spring 90 so that the sliding clutch member 81 is moved to the right (as shown) to its second position in which its external splines 84 engage with splines or teeth 86 on the ring gear and disengage from the splines or teeth 85 on the carrier arm. In this position, the ring gear 114 is locked so that it cannot rotate about the axle whilst the carrier arm is free to rotate about the axle. Again, the friction drive between the sun gear spur 111a and the clutch actuator member 88 slips to allow the sun gear 11 to rotate relative to the actuator member once the sliding clutch member has reached the extent of its movement.

The slide clutch mechanism 80 thus provides an alternative arrangement for selectively locking either the ring gear 114 or the carrier arm 113 to the axle in dependence on the direction of rotation of the sun gear 111 and hence the power input. The clutch slide mechanism could be incorporated into any of the embodiments disclosed herein with reference to FIGS. 1 to 5, 12 and 13 in place of the first and second clutch mechanism. When incorporated in the seventh embodiment as shown in FIGS. 12 and 14, the slide clutch mechanism is operative to lock the auxiliary ring gear to the axle.

Figure 16:
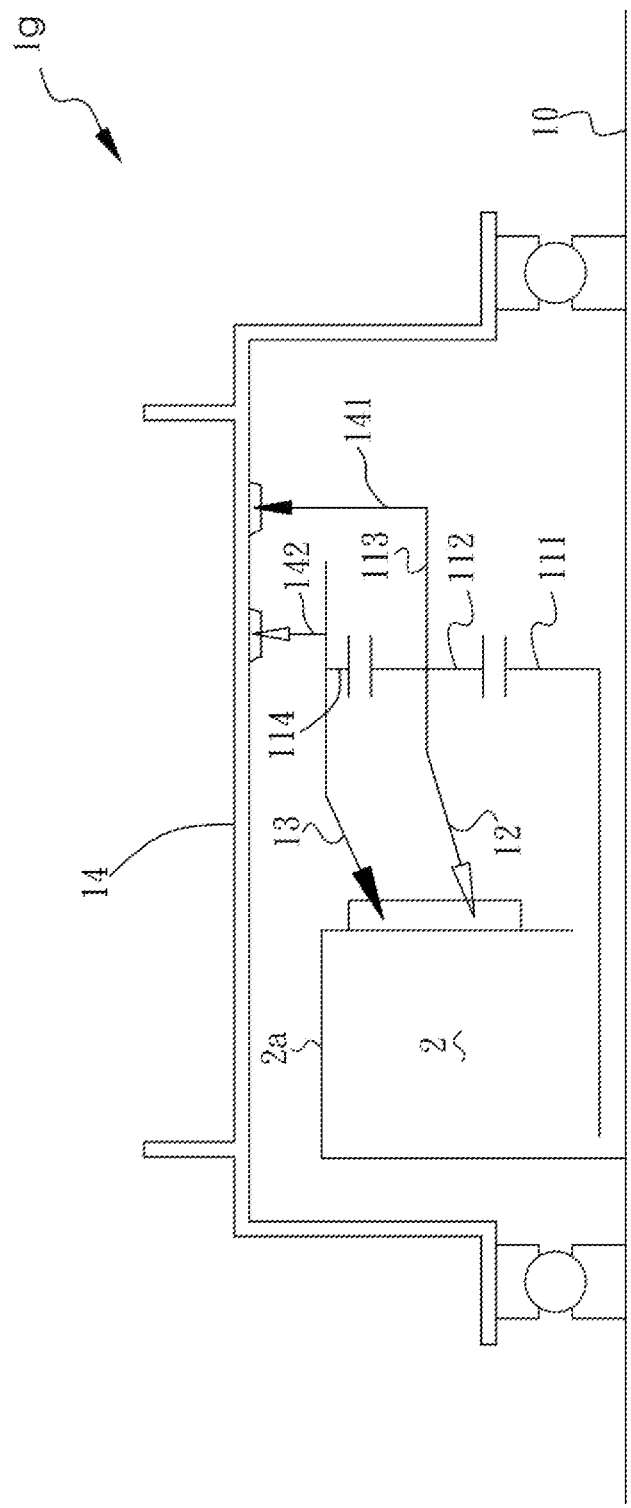
FIG. 16 is a schematic diagram showing in cross-section a ninth preferred embodiment of speed changing apparatus according to the invention in high-speed mode.

A ninth preferred embodiment of speed changing apparatus 1g of the invention as shown in FIG. 16 is substantially similar to the first preferred embodiment shown in FIG. 1 and FIG. 2. Thus identical elements and structures will not be reiterated. The differences between the speed changing apparatus in the first and the ninth preferred embodiments are described below: The motor 2 has an outer casing 2a that is rotationally fixed relative to the axle and rather than the first and second one way clutches 12, 13 being operative to connect the carrier arm 113 and the ring gear 114 directly with the axel 10, in this embodiment the first and second one way clutches 12, 13 are operatively disposed between the carrier arm 113 and the ring gear 114 and the casing. This embodiment illustrates how the first and second one way clutches can be used to rotationally fix the carrier arm and ring gear by coupling them to any rotationally fixed component. The first and second one way clutches are both operative in the same rotary direction (clockwise or counter clockwise) so that one of the carrier arm 113 and ring gear 114 is rotationally fixed in dependence on the direction of rotation of the power input, the other of the carrier arm and the ring gear driving the sleeve ring through their respective third or fourth one way clutch. The first and second one way clutches 12, 13 need not both be operatively connected with the same rotationally fixed component but the can be used to couple the carrier arm and ring gear with different rotationally fixed components if desired.

Figure 17:
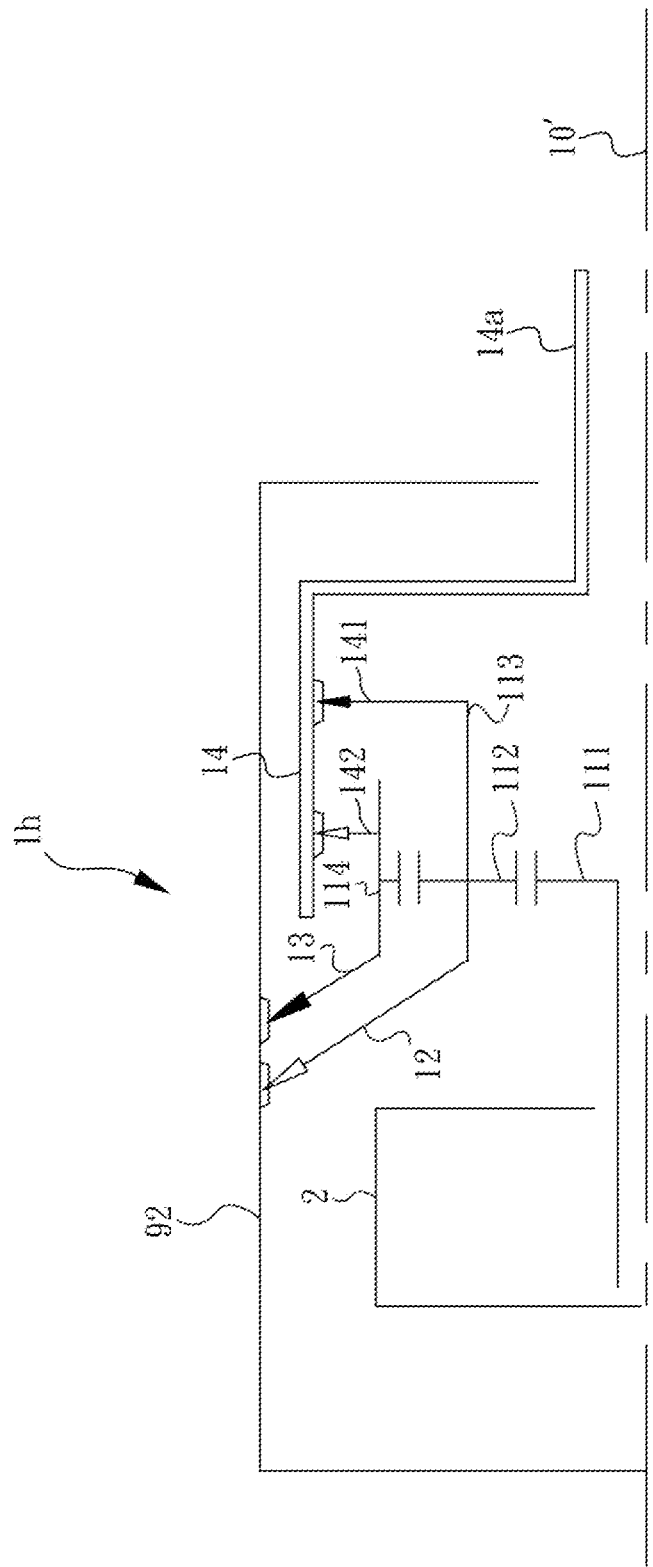
FIG. 17 is a schematic diagram showing in cross-section a tenth preferred embodiment of speed changing apparatus according to the invention in high-speed mode.

A tenth preferred embodiment of speed changing apparatus 1h of the invention as shown in FIG. 17 is substantially similar to the first preferred embodiment shown in FIG. 1 and FIG. 2. Thus identical elements and structures will not be reiterated and only the differences between the speed changing apparatus in the first and tenth preferred embodiments will be described. The tenth embodiment illustrates how a speed changing apparatus 1h in accordance with the invention can be adapted for use in a power tool rather than as part of a wheel hub for an electric vehicle. In the tenth embodiment, the apparatus is not mounted about an axle but rather the sun gear 111, carrier arm 113, ring gear 114 and the output sleeve ring 14 are mounted for rotation about a common axis 10' relative to an outer casing 92. The first and second one way clutches 12, 13 are operatively disposed between the outer casing 92 and the carrier arm 113 and the ring gear 114 respectively. As in the first embodiment, the first and second one way clutches 12, 13 are both operative to engage in the same rotary direction so that one of the carrier arm and the ring gear is rotationally fixed by being coupled to the outer casing 92 depending on the direction of rotation of the power input 2. The other of the carrier arm and the ring gear is drivingly coupled to the sleeve ring through either the third or the fourth one way clutch 141, 142 as described above in relation to the first embodiment. In the tenth embodiment, the sleeve ring 14 has an output portion 14a which projects axially from one end of the outer casing 92. The output portion 14a could be in the form of a drive formation.

It can be seen then that a speed changing apparatus in accordance with the invention comprises a planet gear set 11 including a sun gear 111, planet pinions 112, a planet pinion carrier 113 and a ring gear 114 mounted for rotation about and axis 10 inside a sleeve ring 14. The sun gear is driven by a D.C. motor 2 to rotate in either of two opposed rotary directions. Clutch arrangements 12, 13, 141, 142 are operative to lock one of either the carrier arm 113 or the ring gear 114 to a rotationally fixed component such as axle 10 and to drivingly couple the other of the carrier arm 113 and the ring gear 114 to the shell ring 14 depending on the direction of rotation of the motor. Different gear ratios are thus selected by reversing the direction of rotation of the motor whilst the sleeve ring 14 is always driven in same direction.

The embodiments disclosed above should not be construed as a limitation on the actual applicable scope of the invention. The protected scope of the invention should cover various modifications and similar arrangements within the spirit of the invention and appended claims. As such, all modifications and alterations without departing from the spirit and scope of the invention shall be regarded as further embodiments of the invention. In particular, whilst reference is made in relation to the preferred embodiments to the various components rotating in either a clockwise or counterclockwise direction, it will be appreciated that the direction of rotation of the various components can be reversed from those described. For example, the arrangements disclosed herein can be modified so that the hub shell is driven in a clockwise direction to provide an output. Furthermore, where the power input is supplied by a DC motor, the sun gear can be driven so that it rotates in the same direction as the output shaft of the motor or in the opposite direction. What is important is that the gear ratio is changed by varying the direction of drive of the motor without altering the detraction of rotation of the hub shell or other output member.

Brief description of component representative symbols in the representative drawing of the present invention:

| | |
|---|---|
| 1、1a、1b、1c、1d, 1e, 1f, 1g, 1h~speed changing apparatus | |
| 11~planet gear set | |
| 111~sun gear | 112~planet pinions |
| 113~carrier arm | 114~ring gear |
| 12~first one-way clutch | 13~second one-way clutch |
| 14~sleeve ring/hub shell | 14a~sleeve ring output portion |
| 141~third one-way clutch | 142~fourth one-way clutch |
| 2~power output | 2a~power output casing |
| 3~driving mechanism | 4~first differential mechanism |
| 41~drive gear | 42~driven gear |
| 5~second differential mechanism | |
| 51~first gear (auxiliary sun gear) | 52~auxiliary planet pinion |
| 53~fifth one-way clutch | 54~sixth one-way clutch |
| 6~hub actuator | 61~connecting end |
| 611~clamp fixation end | 62~actuator |
| 621~coupling groove | 622~seventh one-way clutch |
| 63~friction clutch | 631~fixed end |
| 64~suppressor | 641~inner tooth ring |
| 642~sleeve | 6421~open slot |
| 6422~positioning dot | 65~clutch module |
| 651~eighth one-way clutch pawl | 6511~guide angle |
| 652~concave slot | 6521~lower endpoint |
| 6522~upper endpoint | 7~electromagnetic switch |
| 71~electromagnetic coil | 72~magnet |
| 8~third differential mechanism | 112a~auxiliary planet pinion |
| 114a~auxiliary ring gear | 80~slide clutch mechanism |
| 81~sliding clutch member | |
| 82~internal splines (sliding clutch member) | |
| 83~splines (axle) | |
| 84~external splines (sliding clutch member) | |
| 85~splines on carrier arm | 86~splines on ring gear |
| 87~clutch actuator | 88~actuator member |
| 89~stepped internal bore | 90~friction spring |
| 91~screw thread | 92~outer casing |
| 111a~sun gear spur | |

The invention claimed is:
1. A speed changing apparatus comprising:
   a rotary power input selectively rotatable in either one of two rotary directions (clockwise or counter clockwise);
   a planet gear set, comprising a sun gear, a plurality of planet pinions, a carrier arm, and a ring gear; wherein the sun gear is drivingly connected to the power input, the sun gear, carrier arm and ring gear being rotatable about an axis;
   a plurality of auxiliary planet pinions, each auxiliary planet pinion being rotatably fast with a respective one of the planet pinions;
   an auxiliary ring gear meshing with the auxiliary planet pinions;
   a sleeve ring mounted about the planet gear set for rotation about the axis;
   a first one-way sleeve ring clutch, operative between the sleeve ring and the carrier arm; and
   a second one-way sleeve ring clutch, operative between the sleeve ring and the ring gear;
   wherein the apparatus has a first clutch arrangement configured to rotationally fix the carrier arm when the power input rotates in one rotary direction and to rotationally fix the auxiliary ring gear when the power input rotates in the other rotary direction and in that the first and second one-way sleeve ring clutches are each operative to engage to transmit drive to the sleeve ring from the carrier arm and the ring gear respectively in the same rotary direction.

2. A speed changing apparatus as claimed in claim 1, wherein the first clutch arrangement comprises a first one-way clutch operatively disposed between a rotationally fixed component and the carrier arm and a second one-way clutch operatively disposed between a rotationally fixed component and the auxiliary ring gear, wherein the first one-way clutch and the second one-way clutch are operative to engage in same rotary direction as each other but in the opposite rotary direction to that of the first one-way sleeve ring clutch and the second one-way sleeve ring clutch.

3. A speed changing apparatus as claimed in claim 1, wherein the power input is a direct current motor.

4. A speed changing apparatus as claimed in claim 1, wherein the power input is arranged outside the sleeve ring and is drivingly connected with the sun gear by means of a driving mechanism.

5. A speed changing apparatus as claimed in claim 1, wherein the first one-way sleeve ring clutch and the second one-way sleeve ring clutch are centrifugal one-way clutches.

6. A speed changing apparatus as claimed in claim 1, wherein the speed changing apparatus is disposed on an axle and the sleeve ring is a hub shell.

7. A speed changing apparatus as claimed in claim 2, wherein the speed changing apparatus is disposed on an axle and the sleeve ring is a hub shell, the axle comprising the rotationally fixed component.

8. A speed changing apparatus as claimed in claim 1, wherein the speed changing apparatus includes an outer casing; the sun gear, carrier arm, ring gear and sleeve ring being mounted within the casing for rotation about the axis relative to the casing.

* * * * *